(12) United States Patent
Miller et al.

(10) Patent No.: US 11,271,427 B2
(45) Date of Patent: Mar. 8, 2022

(54) PORTABLE POWER CHARGER ADAPTED FOR ATTACHMENT TO AN ELECTRONIC DEVICE FOR CHARGING

(71) Applicant: Halo2Cloud LLC, Hartford, CT (US)

(72) Inventors: Garold C. Miller, Hartford, CT (US); Nathan Daniel Weinstein, Hartford, CT (US)

( * ) Notice: Subject to any disclaimer, the term of this patent is extended or adjusted under 35 U.S.C. 154(b) by 129 days.

(21) Appl. No.: 16/829,806

(22) Filed: Mar. 25, 2020

(65) Prior Publication Data

US 2020/0259368 A1 Aug. 13, 2020

Related U.S. Application Data

(63) Continuation of application No. 29/717,057, filed on Dec. 13, 2019, now Pat. No. Des. 922,319, and a continuation of application No. 29/717,054, filed on Dec. 13, 2019, now Pat. No. Des. 922,318, and a continuation of application No. 15/802,552, filed on Nov. 3, 2017, now Pat. No. 10,615,552, which is a continuation of application No. 15/488,871, filed on Apr. 17, 2017, now Pat. No. 10,418,839.

(60) Provisional application No. 62/322,954, filed on Apr. 15, 2016.

(51) Int. Cl.
*H01M 10/46* (2006.01)
*H02J 50/10* (2016.01)
*H02J 7/34* (2006.01)
*H02J 7/00* (2006.01)

(52) U.S. Cl.
CPC ............ *H02J 50/10* (2016.02); *H02J 7/0042* (2013.01); *H02J 7/342* (2020.01); *H02J 7/00* (2013.01)

(58) Field of Classification Search
CPC ...... H02J 7/0042; H02J 7/0044; H02J 7/0045; H02J 7/342; H02J 50/005; H02J 50/10
USPC .......................... 320/107, 108, 111, 114, 115
See application file for complete search history.

(56) References Cited

U.S. PATENT DOCUMENTS

| | | |
|---|---|---|
| D296,440 S | 6/1988 | Smith et al. |
| D537,036 S | 2/2007 | Chen |
| D587,267 S | 2/2009 | Wang |
| D662,050 S | 6/2012 | Tien |
| D662,878 S | 7/2012 | Fahrendorff et al. |
| D672,309 S | 12/2012 | Tien |
| D674,748 S | 1/2013 | Ferber et al. |
| D677,261 S | 3/2013 | Hsu et al. |

(Continued)

*Primary Examiner* — Edward Tso
(74) *Attorney, Agent, or Firm* — Lathrop GPM LLP

(57) ABSTRACT

A portable power charger is provided for charging an electronic device from a rechargeable battery internally disposed within the charger. An attachment system is also provided for connecting the electronic device to the portable charger and maintaining the connection during charging, whether by wireless means or by direct charging connection. The attachment system can also ensure that respective wireless transmission components in the portable charger and the electronic device, where available, are properly aligned for optimal and efficient wireless charging. The alignment system can comprise an arrangement of magnets on each of the portable charger and the electronic device, whereby said magnets are geometrically arrangement is spaced apart relationship to one another. The alignment system may alternatively comprise a sticky pads, suction cups or hook-and-loop fasteners to physical attach the electronic device to the portable charger.

24 Claims, 18 Drawing Sheets

(56) References Cited

U.S. PATENT DOCUMENTS

| | | |
|---|---|---|
| D686,153 S | 7/2013 | Qu |
| D692,375 S | 10/2013 | Mamane |
| D692,826 S | 11/2013 | Aida et al. |
| D695,214 S | 12/2013 | Robets et al. |
| D700,139 S | 2/2014 | Chan et al. |
| D704,626 S | 5/2014 | Li |
| D705,782 S | 5/2014 | McParland et al. |
| D709,026 S | 7/2014 | Lee et al. |
| D713,785 S | 9/2014 | Tehrani |
| 9,197,087 B2 | 11/2015 | Lai |
| D749,596 S | 2/2016 | Khodapanah et al. |
| D765,070 S | 8/2016 | Franklin |
| D776,050 S | 1/2017 | Awad et al. |
| D782,974 S | 4/2017 | Ju |
| D789,358 S | 6/2017 | Yang et al. |
| 9,689,527 B2 | 6/2017 | Franklin |
| D791,697 S | 7/2017 | Precheur |
| D792,416 S | 7/2017 | Tsai |
| D804,411 S | 12/2017 | Lentine |

| | | |
|---|---|---|
| 2006/0052144 A1 | 3/2006 | Seil et al. |
| 2010/0078536 A1 | 4/2010 | Galvin |
| 2010/0294818 A1 | 11/2010 | LaFargue et al. |
| 2011/0291614 A1 | 12/2011 | Yeh |
| 2013/0026983 A1 | 1/2013 | Yamamoto et al. |
| 2013/0082543 A1 | 4/2013 | Tang |
| 2013/0150134 A1 | 6/2013 | Pliner et al. |
| 2013/0307470 A1 | 11/2013 | Watanabe et al. |
| 2013/0320913 A1 | 12/2013 | Chen |
| 2014/0091765 A1* | 4/2014 | Law .............. H02J 7/0042 320/111 |
| 2014/0111159 A1 | 4/2014 | Siminoff et al. |
| 2014/0132206 A1 | 5/2014 | Zhu |
| 2015/0015196 A1 | 1/2015 | Ormesher et al. |
| 2015/0028797 A1* | 1/2015 | Miller .............. H02J 7/342 320/103 |
| 2016/0003270 A1 | 1/2016 | Franklin |
| 2016/0072338 A1 | 3/2016 | Makwinski et al. |
| 2016/0111692 A1 | 4/2016 | Morita et al. |
| 2017/0110902 A1* | 4/2017 | Miller ............ H02J 7/0044 |

\* cited by examiner

PORTABLE POWER CHARGER ADAPTED FOR ATTACHMENT TO AN ELECTRONIC DEVICE FOR CHARGING

CROSS-REFERENCE TO RELATED APPLICATION

This application is a continuation-in-part and claims the benefit of U.S. application Ser. No. 15/802,552, filed Nov. 3, 2017, which is a continuation and claims the benefit of U.S. application Ser. No. 15/488,871, filed Apr. 17, 2017, now U.S. Pat. No. 10,418,839, which claims the benefit of U.S. Provisional Application Ser. No. 62/322,954, filed Apr. 15, 2016, each of which is incorporated herein by reference in its entirety. This application is also a continuation and claims the benefit of U.S. Design application Ser. No. 29/717,054, filed Dec. 13, 2019, and U.S. Design application Ser. No. 29/717,057, filed Dec. 13, 2019, each of which is incorporated herein by reference in its entirety.

FIELD OF INVENTION

The present invention generally relates to a power charging apparatus, and more particularly relates to a portable power charger and an associated system for attaching said portable power charger to mobile electronic devices for charging.

BACKGROUND OF THE INVENTION

Present day consumers typically own several electronic devices specifically designed for portability and on-the-go use, including, for example, a mobile phone or smart phone, a portable music player like an iPod® or an MP3 player, a tablet, a portable gaming unit, a camera, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source.

With traditional power sources, such as those noted above, it is often difficult to charge multiple devices at the same time, especially where each device requires a separate charging cable. For example, a car charger port may only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters are separate from portable power sources and tend to be bulky.

Similarly, connection interface attachments are also available for adapting a charging cable for use with a variety of devices for recharging from a power source, each requiring a different interface connection. However, such attachments are usually separate small pieces, and therefore difficult to keep track of when not in use. Further, use of such attachments does not solve the problem presented by the need to charge multiple devices at the same time, from the same power source, as oftentimes, only one attachment can be used with a charging cable at a time.

Portable power chargers exist that permit recharging of electronic devices when a standard power source is not readily available. For example, portable power chargers are illustrated and described in Applicant's U.S. Pat. No. 9,973,016, which shares common inventors with the present application and which is incorporated herein by reference. Some existing power charger devices usually cannot charge multiple devices at the same time, either due to limited capacity or connectivity options. Even if multiple devices may be attached to the power charger at the same time, the charger may prioritize how the devices are recharged—i.e., it will charge one device first and then the second, and so on. However, this approach takes a long time to recharge all devices and risks not having sufficient charge remaining in the charger for fully charging the second device.

Further, some portable charger devices will not permit recharging from the portable power charger when the charger is itself being recharged or connected to an external power source. Such devices require the charger unit to be disconnected from a power source before a charge will be passed on to a device connected to the charger, or require the charger unit to be fully charged first before any device connected to the charger unit can then be recharged.

In addition, portable power chargers generally remain separate from and unattached to electronic devices when the portable power chargers are not in use and are only connected to electronic devices via cables and adapters when recharging the electronic devices. This means that the portable power charger must be carried separately from and in addition to the electronic device when not in use so that it is available when needed to charge the electronic device. Even when the portable power charger is connected to an electronic device via a connector cable and/or adapter for charging, simultaneously carrying both the portable power charger and the electronic device in one's hands is awkward and unwieldy, one or both of the devices could be accidentally dropped, and the charging cable can be easily disconnected from the charger and/or the device, disrupting the charging process.

Wireless power chargers have also been introduced to the market, especially for mobile electronic devices, that have provided additional approaches to recharging portable electronic devices. Such wireless power transmission devices have been developed in connection with wireless charging standardization efforts, including by the Wireless Power Consortium (WPC), which have led to the adoption of devices that permit recharging of electronic devices without the use of separate chargers for each device. More particularly, the WPC has introduced the Qi wireless charging standard. Qi, which translates to "vital energy," takes its name from the Chinese concept of intangible flow of power and utilizes magnetic coil induction to transmit a charge from a transmitter to a receiver via a magnetic field.

Commonly, a wireless power transmission device utilizing magnetic coil induction includes a charging mat that must be connected to an external power source, such as a wall socket or a car charger socket, in order to transmit power wirelessly. The charging mat includes a transmitter having an induction coil. When a current is passed through the transmitter coil, a magnetic field is generated and transmitted to an electronic device placed on the charging mat. Such a device, in order to be wirelessly charged via the charging mat, must include a receiver having an induction coil, typically connected to the internal battery of the electronic device. When the electronic device is placed on an energized charging mat in a particular location, the receiver receives the wirelessly transmitted power in the form of a magnetic field, which induces a voltage in the receiver coil that can be used to power the electronic device or charge the internal battery of such a device.

Various drawbacks of prior art wireless power chargers have been identified. For example, such wireless chargers are not easily portable and require direct connection to an external power source for operation. Such external power sources are often not readily available, which makes the charger useless for on-the-go use. Additionally, some charging mat designs are often too small to be able to charge more than one electronic device at the same time. As noted, some wireless charging mats require a device to be placed in a particular spot—e.g., a Qi spot—where the transmitter and receiver coils must be properly aligned in order for a charge to be transmitted. If the devices are not properly aligned, there may be no charging. Accordingly, a drawback of prior art wireless charging devices is that it is difficult to ensure that the devices are properly aligned in order to ensure charging activity and efficiency.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations. Additionally, there is a need for such a charger that is portable, has a compact size, is attachable to an electronic device for easy carry and use with the electronic device, and further is easy to use in various conditions and locations to charge one or more electronic devices simultaneously, including but not limited to in a house or office, a car or an airplane, as well as on-the-go, without compromising operation and performance. Further, there is a need for a portable charger that is easily attachable to and detachable from an electronic device allowing for convenient and hands-free charge and carry. Still further, there is a need for an attachment system for such a portable charger that can ensure proper alignment between the charger and an electronic device in need of a recharge in order for the electronic device to be wireless recharged from the portable charger. Still further, there is a need for a portable charger that can be recharged from an external power source or from a wireless power transmission device, providing increase flexibility and convenience of use for the portable charger. Still further, there is a need for a portable charger that can recharge its internal battery from an external power source or a wireless charging device at the same time as an electronic device connected to the charger, either directly or wirelessly, is being recharged by or via the charger unit. Still further, there is a need for a portable charger unit in a compact size that has increased functionality for a user requiring a portable source of power without compromising its ability to successfully and consistently connect to and charge electronic devices, either directly or wirelessly.

Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable power charger is provided for charging one or more portable electronic devices. In general, a portable power charger includes a charger housing having a rechargeable battery unit disposed therein for connecting to and recharging one or more electronic devices, as necessary, and may also include wireless power transmission components, such as a transmitter and a receiver, for recharging the charger as well as electronic devices via wireless power transmission methods. The portable power charger may also include at least one power connection port for directly connecting the portable power charger with an external power source, or at least one electronic device, or both. Similarly, the portable power charger may also include at least one connector cable interface for directly connecting the portable power charger with an external power source, or at least one electronic device, or both.

In embodiments of the present invention, the portable power charger can include a wireless transmitter operatively connected to the internal rechargeable battery for transmitting a power charge to an electronic device having a wireless receiver. The portable power charger may further include a wireless receiver operatively connected to the internal battery for receiving a power charge from a power source having a wireless transmitter. In embodiments of the portable power charger including both a wireless transmitter and a wireless receiver, the portable power charger can both be charged wirelessly, for example, when placed on a wireless power transmission device (e.g., wireless charging mat), and charge other devices wirelessly, for example, when a device is placed on the charger housing.

In alternate embodiments of the present invention, the portable power charger can simply be designed for direct charging of electronic devices—for example, through connection via a power connection port provided on the charger housing or via a connector cable provided with the portable power charger. Such a connector cable can be storable within a storage cavity formed in the charger housing where the connector cable is stored when not in use and from which the connector cable can be flexed out for connection to an electronic device in need of a charge from the portable power charger or alternately to an external power source for recharging the internal battery unit of the portable power charger. Further, the connector cable can be fully removed for use with a power connection port provided on the charger housing, or operatively connected with the internal battery unit through the storage cavity. Still further, a number of interchangeable connector cables can be provided with the portable power charger, each adapted to be stored in a common storage cavity, and changed out with one another as needed.

In addition, in accordance with an aspect of the present invention, the portable power charger includes an attachment system, preferably comprising at least two disparate attachment means for attaching the portable power charger to an electronic device, and vice versa, so that the portable power charger and the electronic device can connected together during charging, and more preferably, be properly aligned relative to one another for efficient wireless transmission. Additionally, the attachment of the portable power charger directly to the electronic device permits the charger and electronic device to be carried by the user as one unit, while also facilitating and improving the charging of the electronic device, either by wireless charging, or by direct charging connection, in accordance with embodiments of the present invention. Still further, the attachment system ensures proper alignment of the electronic device with the portable power charger for wireless Qi charging, and also maintains such alignment during the charging process—for example, a transmitter induction coil in the charger is aligned with a receiver induction coil in the electronic device to ensure proper and efficient wireless connection therebetween.

In an embodiment of the present invention, the portable power charger is attachable to an electronic device via first attachment means comprising one or more magnets disposed on the surface or within the charger housing that interact with a complementary arrangement of one or more magnets or metal pieces provided on the surface of or in an electronic device, allowing for hands free carry and charge. The magnet(s) allows the portable power charger to remain connected to the electronic device while charging but also allows for seamless removal when the charge is completed by pulling the portable power charger apart from the electronic device. Not only do the magnets work to connect the electronic device to the portable charger, but in accordance with the present invention, the magnets work to position and ensure proper alignment of the respective charging components in the charger and the electronic device.

Additionally, the portable power charger is attachable to an electronic device via a second attachment means comprising an adhesive patch that, when pressed against the surface of an electronic device, attaches the electronic device to the charger and allows for hands-fee carry and charge. The adhesive, or sticky, patch allows the portable power charger to remain stuck to the electronic device while charging but also allows for seamless removal when the charge is completed by pulling the portable power charger apart from the electronic device. The adhesive patch is useful when the electronic device is need of a recharge does not include a complementary array of magnets or metal pieces allowing for attachment to the charger via the magnets disposed on the power charger.

In accordance with preferred embodiments of the present invention, the attachment system comprises a plurality of magnets, as a first attachment means, geometrically arranged in spaced apart relationship to one another on or near the surface of the portable charger and positioned around the wireless transmission area of the charger so as not to interfere with the wireless transmissions from the transmitter. The adhesive patch, as a second attachment means, can be positioned in the geometric spacing between the magnetic arrangement.

In one embodiment, an electronic device is provided with an array of magnets geometrically arranged in spaced apart relationship to one another on or near the surface of the electronic device and positioned around the wireless receiving area of the electronic device so as not to interfere with the wireless transmissions directed to the wireless receiver, wherein the geometric arrangement of magnets on the electronic device is complementary to the geometric arrangement of magnets on the charger to ensure proper alignment between the wireless transmitter of the portable charger and the wireless received of the electronic device. In an alternate embodiment, a separate attachment chip is provided that can be attached to an electronic device, whereby the chip includes an array of magnets geometrically arranged in spaced apart relationship to one another such that the array of magnets will be positioned around the wireless receiving area of the electronic device when the chip is connected to said device, wherein the geometric arrangement of magnets on the attachment chip is complementary to the geometric arrangement of magnets on the charger. In another embodiment, the geometric arrangement of magnets for the electronic device can be provided in a case adapted for the electronic device that will place the arrangement in a predetermined location relative to the wireless receiver of said device.

In alternate embodiments, the array on the electronic device or the attachment chip can be pieces of metal that magnetically engage the magnets of the power charger to align the electronic device with the portable charger for wireless charging.

In accordance with embodiments of the present invention, the portable power charger comprises a charger housing with a rechargeable internal battery disposed therein. The internal battery is operatively connected with the wireless transmitter and receiver for charging other electronic devices from the internal battery via the wireless transmitter or for relaying an electrical charge from an external power source for recharging the internal battery when the portable power charger is connected to the power source via the wireless receiver. The charger unit is portable as a result of the small size of the housing. Despite the small size of the unit, the power capacity is very high so that the charger can accommodate multiple electronic devices at the same time.

Additionally, the portable power charger may include one or more power connection interfaces for directly connecting the portable charger with an external power source, or at least one electronic device, or both. For example, the rechargeable internal battery disposed within the charger housing is operatively connected with a power connection interface (such as, a port or a charging cable) for relaying an electrical charge from an external power source for recharging the internal battery when the portable power charger is connected to the power source via the power connection interface (acting as a power input) and/or for charging other electronic devices from the internal battery via the power connection interface (acting as a power output).

In embodiments of the present invention, a power connection interface can comprise a female connection port adapted for receiving a complementary male connection interface of a standard charging cable, which connects at an opposite end to a portable electronic device. In other embodiments, a power connection interface can include a charging cable attached to or provided with the charger housing and preferably stored within a storage cavity in the charger housing when not in use. Such charging cable can even be removable and replaceable with another charging cable so as to change the connection interfaces, as necessary, to coordinate with particular electronic devices. In preferred embodiments of the present invention, the portable power charger includes both wireless charging capabilities, and direct charging connectivity.

In accordance with alternate embodiments of the present invention, the portable power charger comprises a charger housing with a rechargeable internal battery disposed therein. The internal battery is operatively connected with one or more power connection interfaces for directly connecting the portable charger with an external power source, or at least one electronic device, or both. For example, the rechargeable internal battery disposed within the charger housing is operatively connected with a connector cable storable in a storage cavity formed in the charger housing for storing the connector cable when not in use and from which the connector cable can be flexed for connection with an electronic device in need of a charge from the internal battery unit of the portable power charger or an external power source for recharging the portable power charger. More preferably, the connector cable is removable and interchangeable with like shape connector cables, each with a different connection interface so that the portable power charger can be connected to various electronic devices.

Additionally, the portable power charger is attachable to an electronic device via attachment means comprising an adhesive patch that, when pressed against the surface of an electronic device, attaches the electronic device to the charger and allows for hands-fee carry and charge. The adhesive, or sticky, patch allows the portable power charger to remain stuck to the electronic device while charging but also allows for seamless removal when the charge is completed by pulling the portable power charger apart from the electronic device.

In additional embodiments the portable power charger of the present invention can be used to charge multiple electronic devices simultaneously, both via direct connection and wirelessly, as disclosed, for example in U.S. Pat. No. 9,318,915, which shares common inventors with the present invention, and which is incorporated herein by reference.

In various embodiments of the present invention, the portable power charger may further comprise a controller or processing unit, which can control wireless and direct connectivity with the portable power charger, keep track of the capacity level of the rechargeable battery, store data or provide a conduit means by which data can be exchanged between electronic devices, such as between a smart phone and a computer.

In various embodiments of the present invention, the charger unit may include a flashlight feature located on the surface of the housing unit to improve on the functionality of the charger.

These and other objects, features and advantages of the present invention will become apparent in light of the detailed description of embodiments thereof, as illustrated in the accompanying drawings.

DETAILED DESCRIPTION OF THE DRAWINGS

Figure 6:
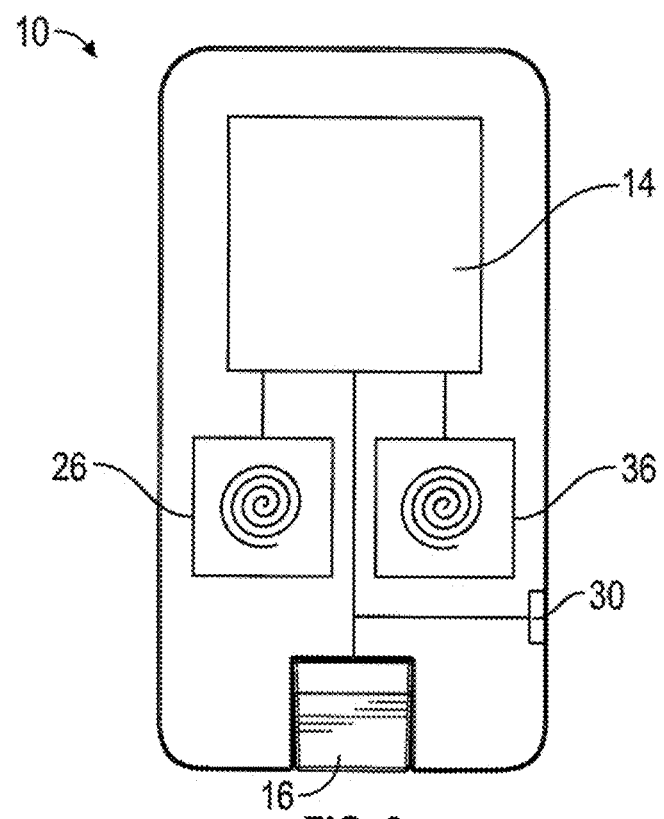
FIG. 6 shows a schematic diagram illustrating internal operational components of the portable power charger of FIG. 1.

A portable power charger in accordance with an embodiment of the present invention is illustrated in FIGS. 1-5, and generally designated as reference numeral 10. The portable power charger 10 generally includes a charger housing 12 having a rechargeable battery unit 14 internally disposed therein. The rechargeable battery unit 14 is generally illustrated in FIG. 6. The power charger 10 is designed for portability and convenient on-the-go use to recharge one or more mobile electronic devices and is designed to be attachable to an electronic device via an attachment system comprising at attachment means provided on or in the charger housing 12. In some embodiments of the present invention, the charger 10 is provided with least two disparate attachment means, each described in more detail below, that allow for hands free carry and charge, while also allowing for easy detachment from the electronic device, once attached and as needed.

The portable power charger 10 is also designed for easy and flexible recharging of the internal battery 14 from a variety of power sources so that it can be easily charged up to have sufficient battery capacity when it is needed to recharge a portable electronic device. Preferably, the rechargeable battery unit 14 of the portable power charger 10 is capable of being recharged in a variety of manners, including via direct connection and via wireless connection. For example, to charge the battery unit 14, the charger 10 may be connected with an external power source via a power input connector cable interface provided with the charger 10; via direct connection with an external power source via a separate connector cable that engages a power connection port interface provided on the charger housing 12; or via wireless power transmission means. A portable power charger 10 in accordance with the present invention can include any or all of these recharging features in various combinations without departing from the principles and spirit of the present invention.

Similarly, the portable power charger 10 can be used to recharge one or more electronic devices in a variety of manners, including via direct connection and via wireless connection. For example, to use the portable charger 10 to recharge an electronic device, generally designated as reference numeral 200 and generally illustrated, for example, in FIG. 7, the charger 10 may be connected with the electronic device 200 via a power output connector cable interface provided with the charger 10 (as illustrated in the charger embodiment shown in FIGS. 19-25); via direct connection with the electronic device 200 via a separate connector cable 202 that engages a power connection port interface 16 (as shown, for example, in FIG. 8C) provided on the charger housing 12; or via wireless power transmission means. A portable power charger 10 in accordance with the present invention can include any or all of these recharging features in various combinations without departing from the principles and spirit of the present invention.

Referring to the embodiment illustrated in FIGS. 1-5, the portable power charger 10 of the present invention has the capability of charging other devices or being recharged itself via wireless transmissions, or via direct connections, either using connector cables provided with and stored in the charger housing 12, or via separate connector cables attachable to the charger 10 via power connection ports provided on the charger housing 12. In this regard, the portable charger 10 can be used on-the-go to charge one or more electronic devices 200 by various means and combination of means.

As noted, the portable power charger 10 of the illustrated embodiments includes the capability of charging electronic devices 200 via wireless power transmission. In this regard, the portable power charger 10 includes a wireless transmitter 26 for transmitting a charge to an electronic device 200, as schematically illustrated in FIG. 6. In alternative or additional embodiments, the portable power charger 10 may also include a wireless receiver 36 for receiving a charge from a wireless charging mat or power transmitting device allowing the charger unit 10 to be recharged either wirelessly or via direct connection to an external power source, and at the same time be connected to multiple electronic devices 200 by both wireless and direct connection means such as disclosed in U.S. Pat. No. 9,318,915, incorporated herein by reference.

Figure 1:
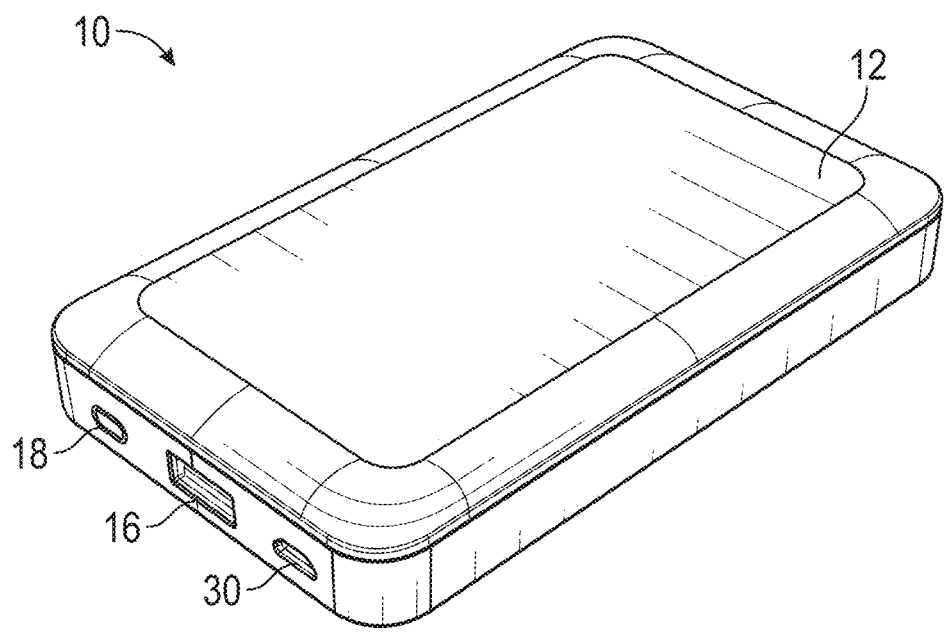
FIG. 1 shows a front, top perspective view of a first embodiment of a portable power charger in accordance with the present invention.
Figure 2:
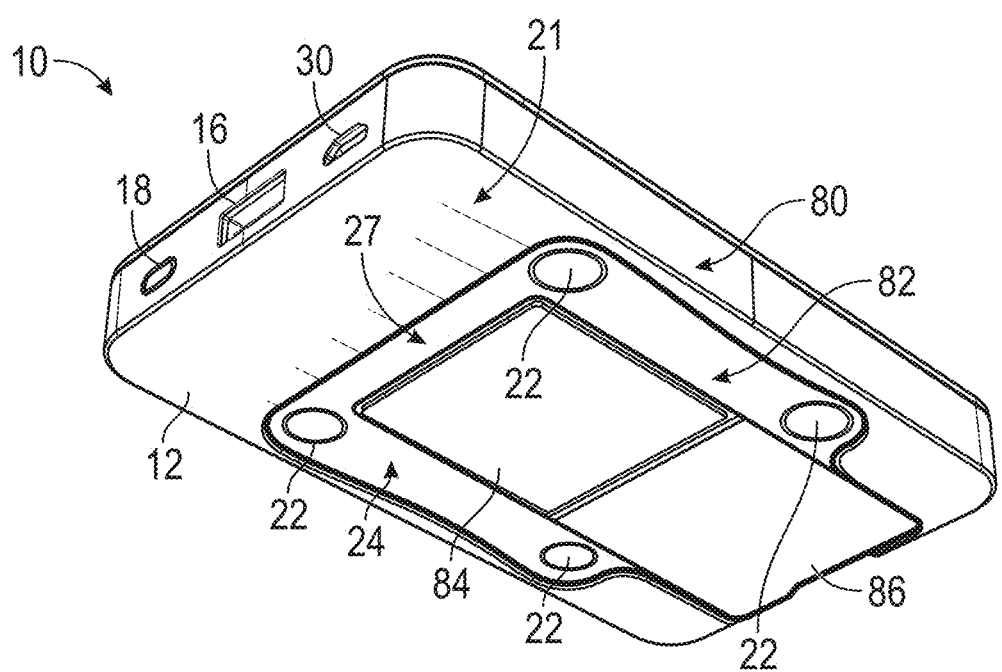
FIG. 2 shows a front, bottom perspective view of the portable power charger of FIG. 1.
Figure 3:
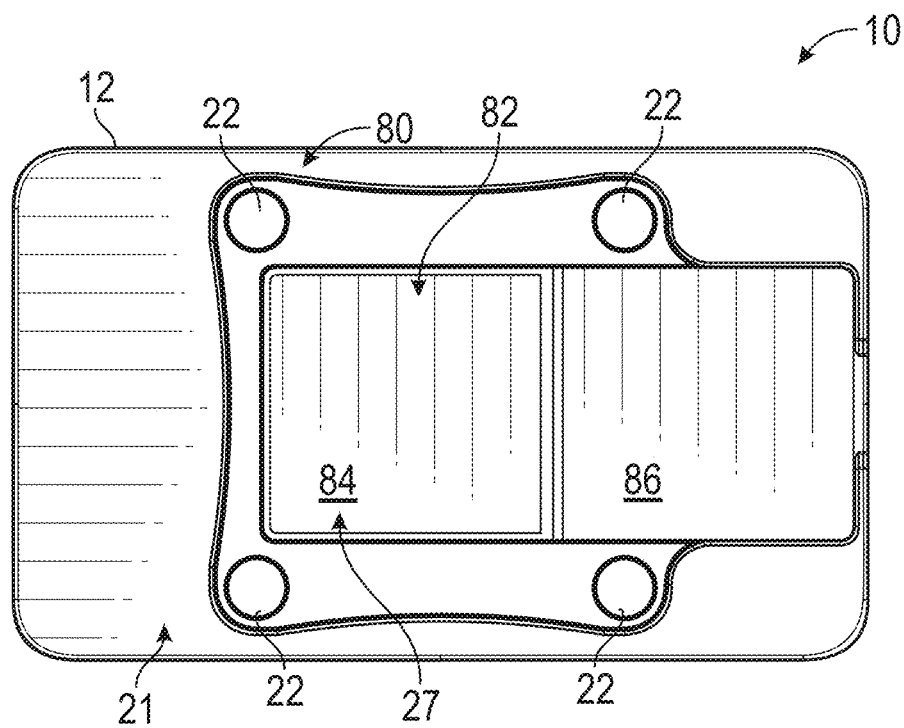
FIG. 3 shows a planar bottom view of the portable power charger of FIG. 1.

The wireless transmitter 26 of the portable power charger 10 generally comprises a magnetic induction coil (not shown) operatively connected to the internal battery unit 14. Referring to FIG. 3, a wireless transmission area 27 generally aligned with the transmitter coil is illustrated. When an electronic device 200 that includes a wireless receiver (as represented by a wireless reception area 237) is aligned with the wireless transmission area 27, a magnetic field generated by the transmitter 26 is transmitted to the electronic device 200, where a voltage is induced to power the electronic device 200 or recharge its internal battery. In this regard, the designated wireless transmission area 27 is preferably visible to the user or at least easily ascertained so as to facilitate proper alignment and wireless charging.

Referring to FIG. 3, the portable power charger 10 includes an attachment system in accordance with the present invention on or disposed within and near a first outer surface 21 of the charger housing 12. A first attachment means, generally designated as reference numeral 80, comprises an arrangement of one or more magnets 22 that interact with magnets or metallic pieces 222 provided on or within the surface of the electronic device 200. When the respective magnets 22 and 222 are aligned, the electronic device 200 is attached to the portable charger 10 for wireless charging of the electronic device 200, while also allowing for hands free carry and charge.

In an embodiment of the present invention, said first attachment means 80 comprises one or more magnets 22 geometrically arranged on or within the first surface 21 of the charger housing 12 in spaced apart relationship to one another. An electronic device 200 is provided with a complementary geometric arrangement of magnets 222 in spaced apart relationship to one another, whereby interaction of the respective geometric arrangements on the portable charger 10 and the electronic device 200 ensure proper alignment of the charger 10 with the electronic device 200 for efficient wireless charging. Use of the first attachment means 80 also allows the portable power charger 10 to remain connected to the electronic device 200 while charging but also allows for seamless removal when the charge is completed. Using the illustrated magnetic array on the portable charger 10, the power charger 10 can be attached to a variety of electronic devices 200 and ensure proper alignment for wireless charging regardless of the size and shape of the electronic device 200, so long as the geometric array of magnets 222 on said devices 200 is properly positioned relative to the appropriate wireless transmission components therein.

The magnetic array 22 on the portable charger 10 could be one, two or even more magnets 22. More preferably, the first attachment means 80 utilizes at least three magnets 22 in a geometric arrangement relative to one another. Even more preferably, the first attachment means 80 utilizes four magnets 22 in a geometric arrangement in spaced apart relationship relative to one another. Referring to FIG. 3, an embodiment of the portable charger 10 with four magnets 22 generally arranged to define a square is illustrated. Preferably, the arrangement of magnets 22 is positioned around and defines an opening 24 generally corresponding to the transmitter induction coil used in the charger 10 for wireless transmission of power to an electronic device 200. Referring to FIG. 3, the four magnets 22 are illustrated as being around the circular transmission area 27 generally aligned with the transmitter induction coil disposed within the charger housing 12. In this regard, the positioning and location of the magnets 22 does not interfere with wireless transmission from the charger 10 or degrade the transmitted charge, while also ensuring that the electronic device 200 in need of a recharge is properly aligned with the transmission area 27 of the charger 10 for optimal and efficient recharging.

Figure 7:
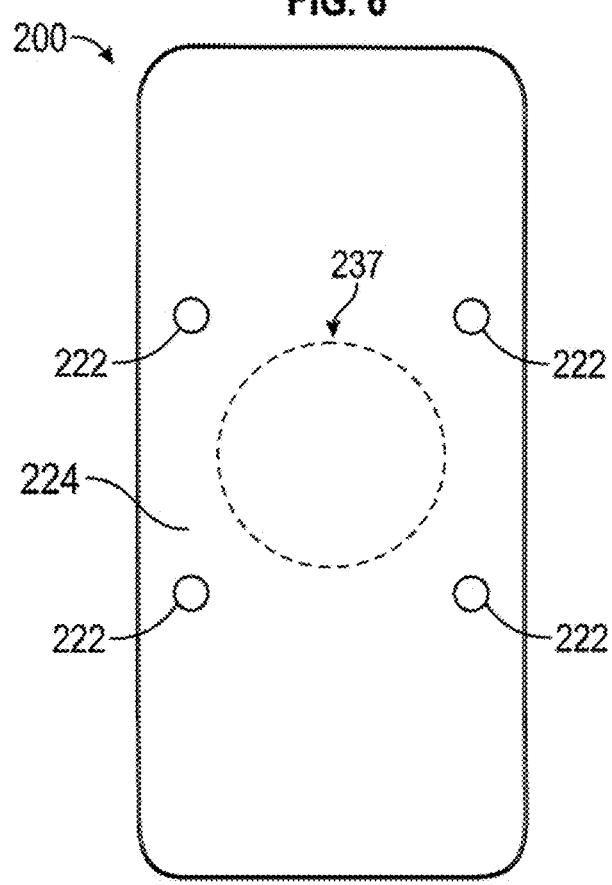
FIG. 7 shows a planar view of a portable electronic device that can be wirelessly recharged by attachment to the portable power charger of FIG. 1.
Figure 8A:
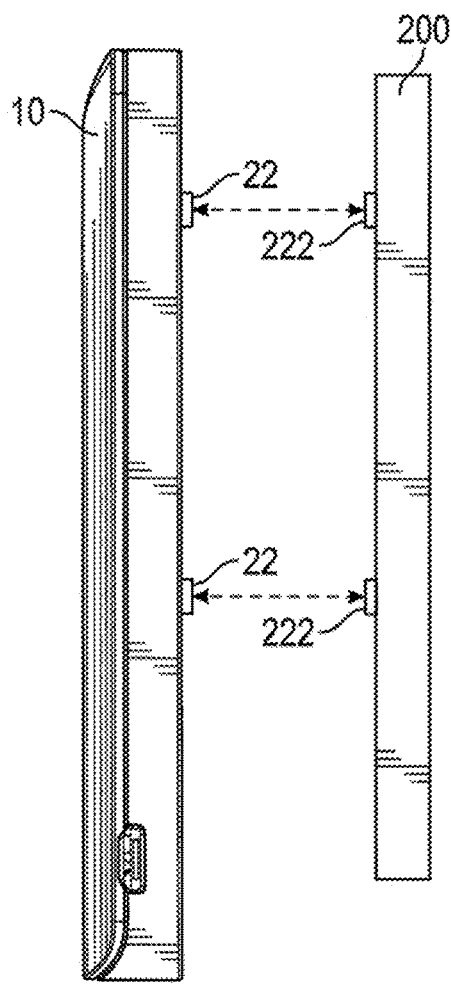
FIGS. 8A, 8B and 8C illustrate attachment of the portable electronic device of FIG. 7 to the portable power charger of FIG. 1 in accordance with embodiments of the attachment system of the present invention.
Figure 8B:
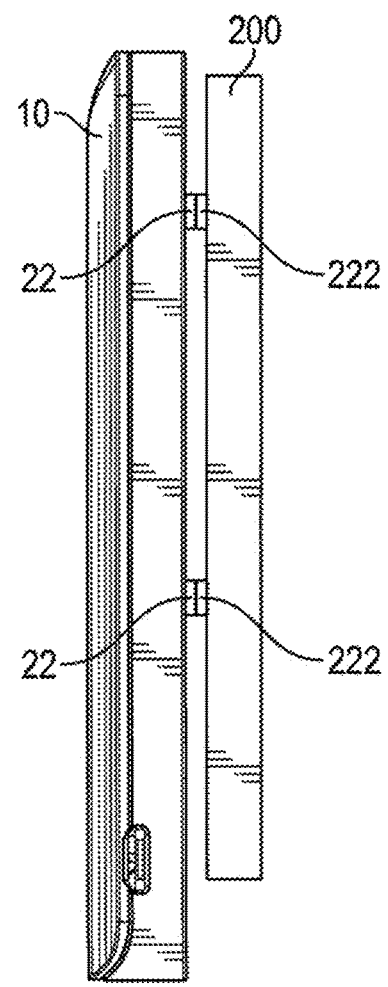
Figure 8C:
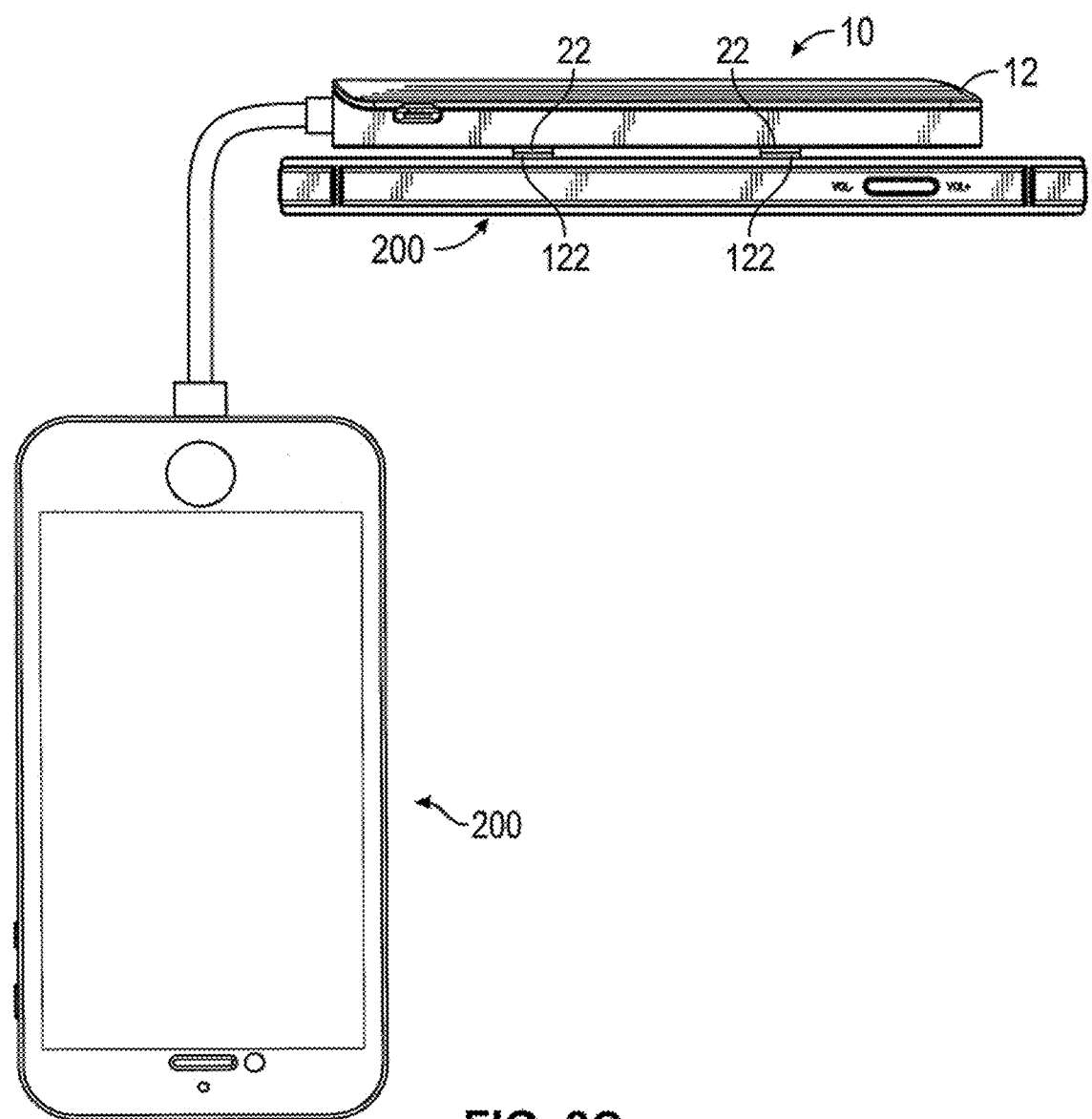
Figure 9A:
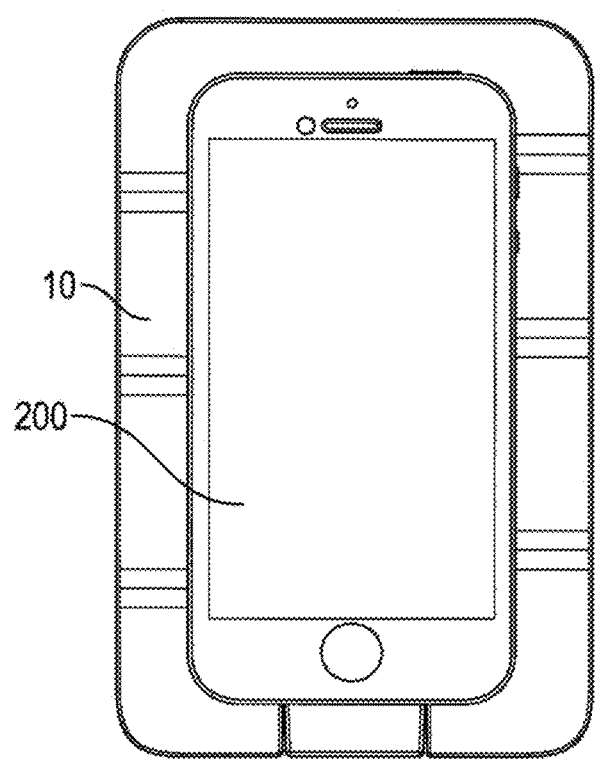
FIGS. 9A and 9B illustrate attachment orientations of the portable electronic device of FIG. 7 relative to the portable power charger of FIG. 1.
Figure 9B:
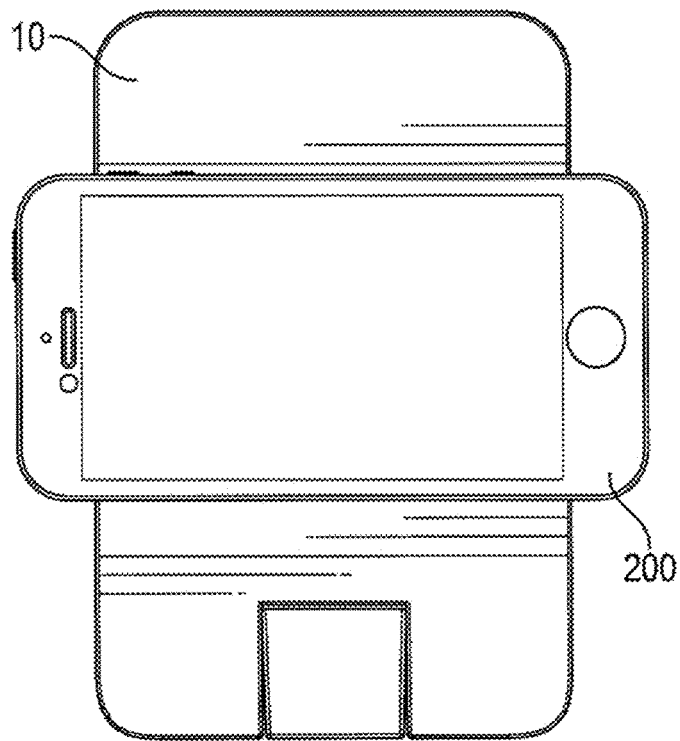

In another aspect of the present invention, an electronic device 200 that can be wirelessly charged from the portable charger 10 is provided with one, two or even more magnets 222 in an arrangement that generally complements the number, location and orientation of magnets 22 on the portable charger 10. For example, an electronic device 200 to be used with the portable charger 10 shown in FIG. 1, would have four magnets or metal pieces 222 geometrically arranged to define a square with the same spacing and size as on the portable charger 10. An exemplary electronic device 200 is illustrated in FIG. 7. As so designed, the magnet arrays 22 and 222 will interact with each other to connect the electronic device 200 to the portable charger 10. As with the magnetic array 22 on the charger 10, the magnetic array 222 on the electronic device 200 is preferably positioned around and defines an opening 224 generally corresponding to the receiver induction coil (not shown) used in the device 200 for receiving a wireless transmission of power from a power source (i.e., the portable charger 10) generally represented by reception area 237 depicted in FIG. 7. Thus, when the respective magnetic arrays 22 and 222 are connected, as represented in FIGS. 8A and 8B, the electronic device 200 is properly aligned with the portable charger 10 so that the receiver in the former is aligned with the transmitter 26 in the latter to maximize the wireless power exchange. Additionally, the magnets 22 and 222 maintain their connection so that there is reduced risk of the electronic device 200 shifting, moving or even coming disconnected during charging.

By using a square arrangement for the magnets 22 on the charger 10, and further by arranging the magnets 22 around the transmission area 27 of the charger 10, any electronic device 200 having a complementary arrangement of magnets or metal pieces 222 can be connected to the portable charger 10 in either of two directions but still be ensured of having the critical wireless transmission components aligned, as generally illustrated in Applicant's co-pending U.S. application Ser. No. 15/802,552, incorporated herein by reference. Moreover, electronic devices 200 of any size or shape can be perfectly aligned with the portable charger 10 merely by including a magnetic or metallic array matching the geometric arrangement of magnets 22 on the portable charger 10. Alternate numbers and arrangements of magnets can be used without departing from the principles and spirit of the present invention. Using three or more magnets in a spaced apart geometric arrangement will ensure consistent and desired X- and Y-alignment between the portable charger 10 and the electronic device 200.

In an alternate embodiment, an attachment chip 100 can be used to provide electronic devices 200 with means for attachment to and proper alignment with the portable charger 10 shown herein. Such an attachment chip 100 is beneficial for electronic devices 200 that have not been previously provided with the requisite magnets or metal pieces 222 for magnetic attachment to the portable power charger 10. Indeed, electronic devices 200 can be retrofitted for such connection using the attachment chip 100. Indeed, the attachment chip 100 can be used to connect an electronic device 200 to the portable power charger 10 even if the electronic device 200 is not capable of wireless charging or the portable charger 10 does not include a wireless transmitter (in accordance with alternate embodiments of the present invention). In this regard, the attachment chip 100 (as provided on an electronic device 200) can help keep the electronic device 200 attached to the portable charger 10 during transport.

Referring to FIGS. 10A-10E, an attachment chip 100 comprises a thin, generally flat chip or disc 102 having magnets (or metallic pieces) 122 positioned therein or thereon in a geometric arrangement in a spaced apart relationship to one another, whereby the geometric arrangement generally complements the magnetic array 22 provided on the portable charger 10. While the various magnets 122 are depicted in the Figures herein as outwardly projecting from the chip material, such magnets 122 can be embedded within and even hidden within the chip material without departing from the spirit and principles of the present invention. In general, the presence of the magnets 122, the projection of the magnets 122 and the thickness of the disc material are embellished slightly in the drawing figures to emphasize and highlight features of the present invention.

Figure 10A:
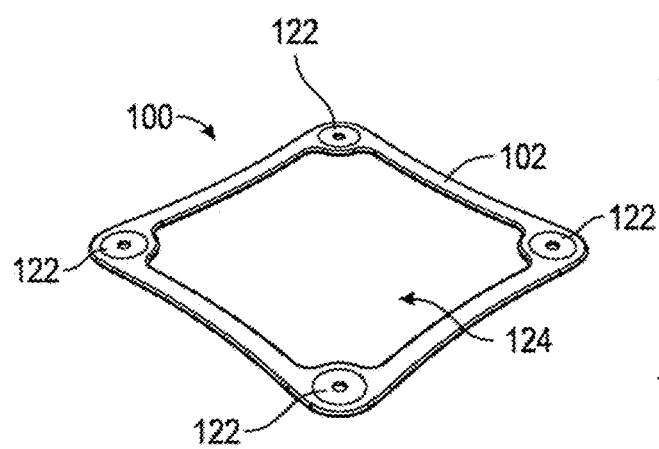
FIGS. 10A-10E illustrate front and back perspective views and planar front, back and side views of a first embodiment of an attachment chip in accordance with the present invention for use to connect an electronic device with the portable power charger of FIG. 1.
Figure 10C:
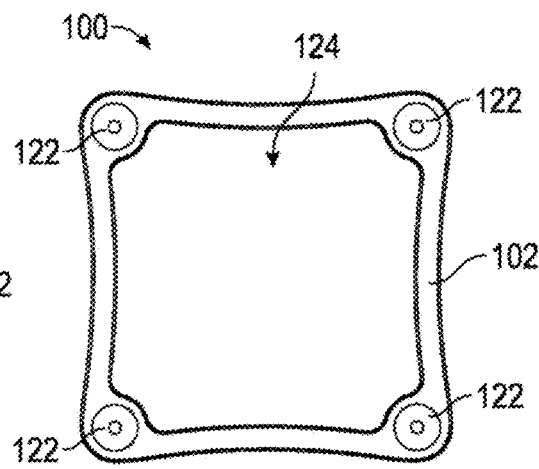
Figure 10B:
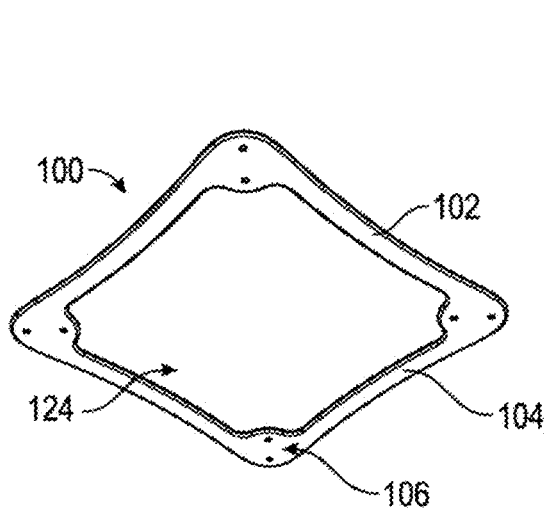
Figure 10D:
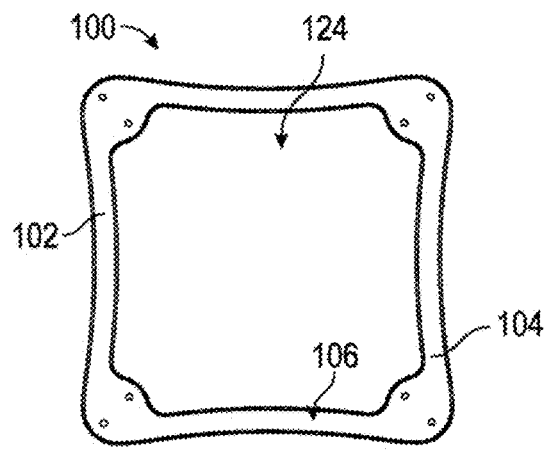
Figure 10E:
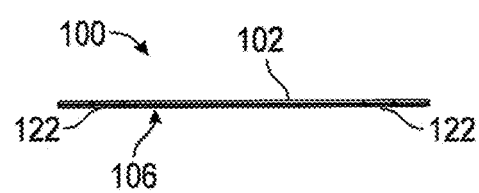
Figure 11:
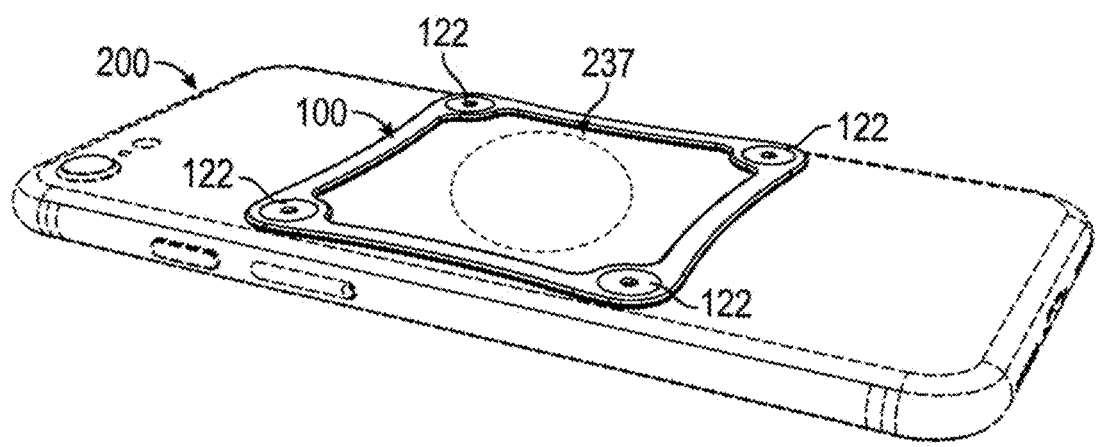
FIG. 11 shows a perspective view of a portable electronic device having the attachment chip of FIG. 10A that can be wirelessly recharged by attachment to the portable power charger of FIG. 1.

The attachment chip 100 is preferably manufactured from a thin, generally flat plastic material and includes an adhesive layer 104 or some other means of attaching the chip 100 to the back of an electronic device 200 with which the attachment system is to be used. For example, as shown in FIG. 10D, the chip 100 has an attaching surface 106 that can connect and hold flush to the outer surface of the electronic device 200 using the adhesive layer 104 provided on said attaching surface 106. Preferably, the chip 100 is attached to the electronic device 200, as generally illustrated in FIG. 11, so that the magnetic array 122 of the chip 100 is positioned around the reception area 237 for the device 200 so that the respective magnets 22 and 122 on the portable charger 10 and the attachment chip 100 will align said reception area 237 with the transmission area 27 of the portable charger 10 without interfering with wireless transmissions from the portable charger 10. In this regard, the chip 100 can include a central opening 124 between the magnets 122, such as shown in FIG. 10A, for example, to help attach the chip 100 to the electronic device 200 in a desired and predetermined location and orientation.

Figure 12A:
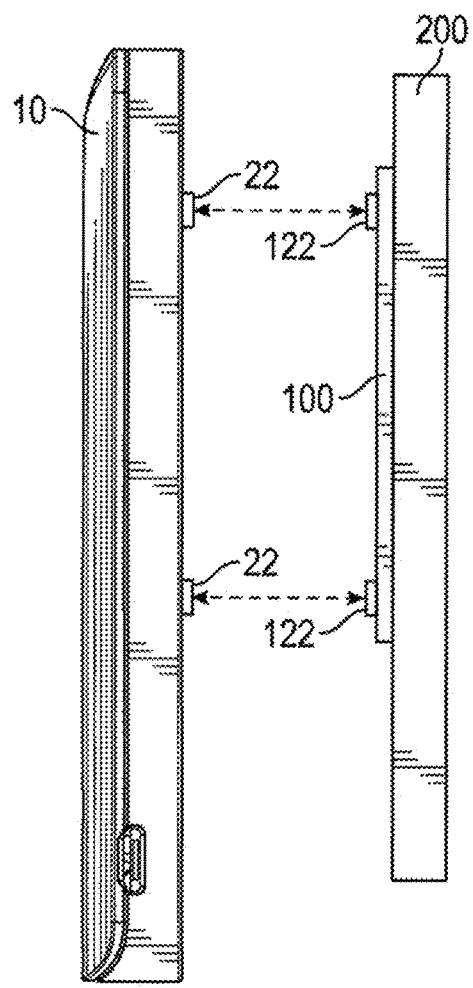
FIGS. 12A and 12B illustrate attachment of the portable electronic device with attachment chip per FIG. 11 to the portable power charger of FIG. 1 in accordance with an embodiment of the attachment system of the present invention.
Figure 12B:
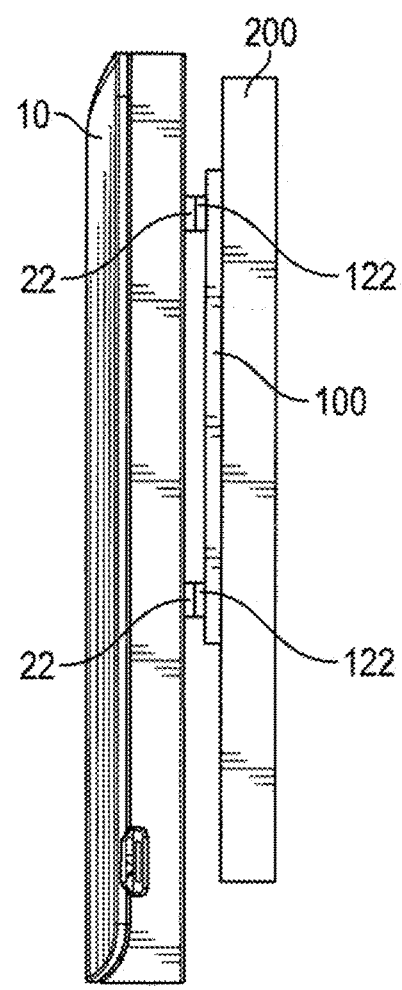

When it is desirable to wirelessly recharge the electronic device 200, the magnets 122 on the attachment chip 100 can be aligned with the magnets 22 on the portable charger 10, such as shown in FIGS. 12A and 12B. When the respective magnets 22 and 122 interact, the electronic device 200 will be attached to the portable charger 10 and the complementary shapes of the respective magnetic arrays 22 and 122 will ensure proper alignment of the wireless transmission components to ensure proper and efficient wireless charging.

FIGS. 10A-10E illustrate an exemplary design of an attachment chip 100 that can be used in accordance with the present invention. Various additional and alternate designs, shapes and sizes of attachment chips 100 are illustrated and described in co-pending U.S. application Ser. No. 15/802, 552, filed Nov. 3, 2017, owned by Applicant and which is incorporated herein by reference in its entirety.

Referring again to FIG. 3, the portable power charger 10 also includes a second attachment means, generally designated as reference numeral 82, on the first surface 21 of the charger housing 12. The second attachment means 82 generally comprises an attaching surface that, when pressed against the surface of an electronic device 200, attaches the portable charger 10 to the electronic device 200, and vice versa, connecting the units together and allowing for hands-free carry and charge. In an embodiment of the present invention, said second attachment means 82 comprises a pressure-sensitive adhesive, or "sticky", patch 84 which allows the portable power charger 10 to remain stuck to the electronic device 200 while charging, but allows for seamless removal when the charge is completed. The adhesive patch 84, for example, could comprise a pad made of sticky, reusable silicone rubber. Using the illustrated adhesive patch 84, the power charger 10 can be attached to a variety of electronic devices 200, regardless of size and shape.

Referring to FIG. 3, the adhesive patch 84 is preferably positioned within the opening 24 of the geometric magnetic array 22. In this regard, the adhesive patch 84 provides an alternate attachment means that is useful for electronic devices 200 that do not include the requisite magnets or metal pieces 222 needed to use the magnetic array 22 provided on the charger 10. Still further, the adhesive patch 84 can work in conjunction with the magnets 22 on the charger 10 to secure the connection between the charger 10 and the electronic device 200, for example, during transit so that a charging cycle is not disrupted.

In use, the adhesive patch 84 is pressed flat against an electronic device 200 to stick the portable power charger 10 onto the electronic device 200. Contact of the second attachment means 82 with and against the electronic device 200 places the wireless charging transmitter 26 in close proximity to a wireless charging receiver of the electronic device 200, enabling wireless power transfer from the portable power charger 10 to the electronic device 200 and ensuring sufficient adhesion between the units. When not in use, the adhesive patch 84 can be covered by a flap 86 so as not to interfere with use of the magnets 22. In FIG. 3, the flap 86 is shown in its open condition.

As with known power transmission devices, the wireless transmitter of a charging device (e.g., charger 10) and the wireless receiver of a device to be charged (e.g., electronic device 200) typically must be aligned for the charge to be transferred. In this regard, the adhesive patch 84 may be positioned over the transmitter 26 of the charger 10. As noted above, the magnetic array 22 is positioned around the adhesive patch 84 such that both attachment means 80 and 82 could work collectively to hold the electronic device 200 in place during charging.

In an alternative embodiment of the second attachment means 82, the means can comprise one or more suction cups to attach the portable power charger 10 to an electronic device 200. Examples of suction cups as an attachment means are shown and described in U.S. Pat. No. 10,418,839, which is incorporated herein by reference. Still further, the means can comprise hook-and-loop connectors attached to the portable power charger 10 and the electronic device 200.

As noted, the second attachment means 82 is useful for attaching the portable charger 10 with electronic devices 200 that do not include magnets or metallic pieces 222 for interaction with a magnetic array 22 on the charger 10. Similarly, the second attachment means 82 are useful for attaching the charger to electronic devices 200 that do not have wireless charging capability, such that the proper alignment between the charger 10 and the electronic device 200 is less important, and the main goal for attaching an electronic device 200 to the charger 10 is simply to attach the two devices together and further to maintain attachment during charge, even if by direct means. Accordingly, in alternate embodiments of the present invention, a portable power charger can be provided with just the second attachment means 82 without departing from the principles and spirit of the present invention. Such an embodiment is generally illustrated in FIGS. 14-18 and described in more detail below.

Figure 13A:
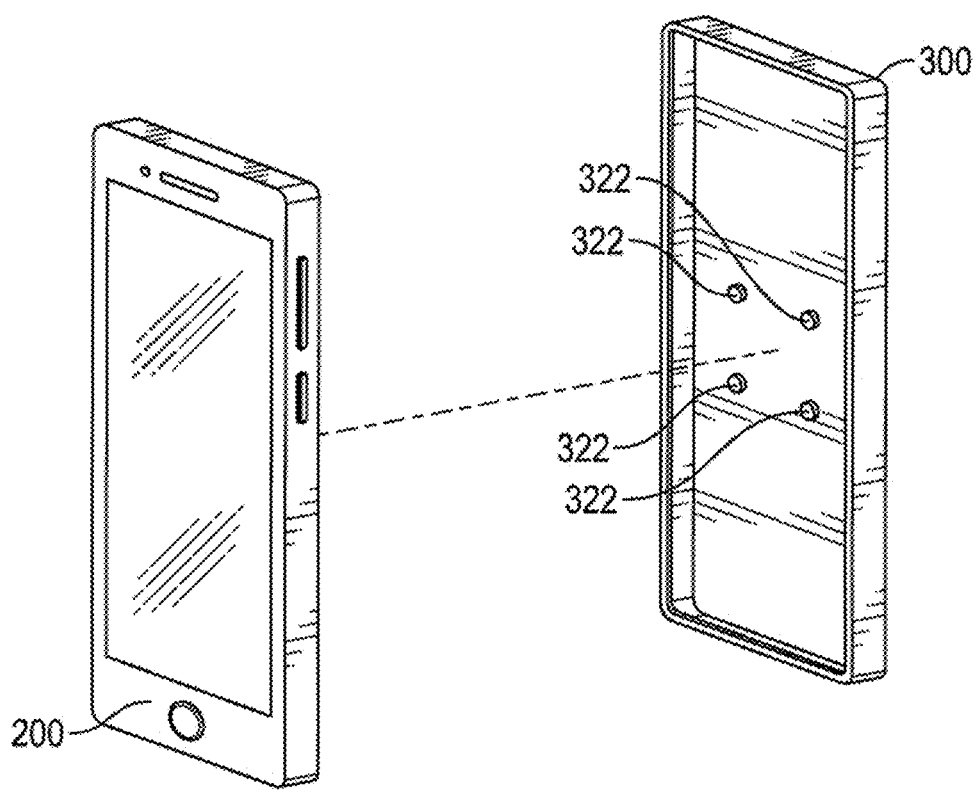
FIGS. 13A, 13B and 13C illustrate use of the attachment chip per FIG. 11 with an electronic device and a protective case therefor.
Figure 13B:
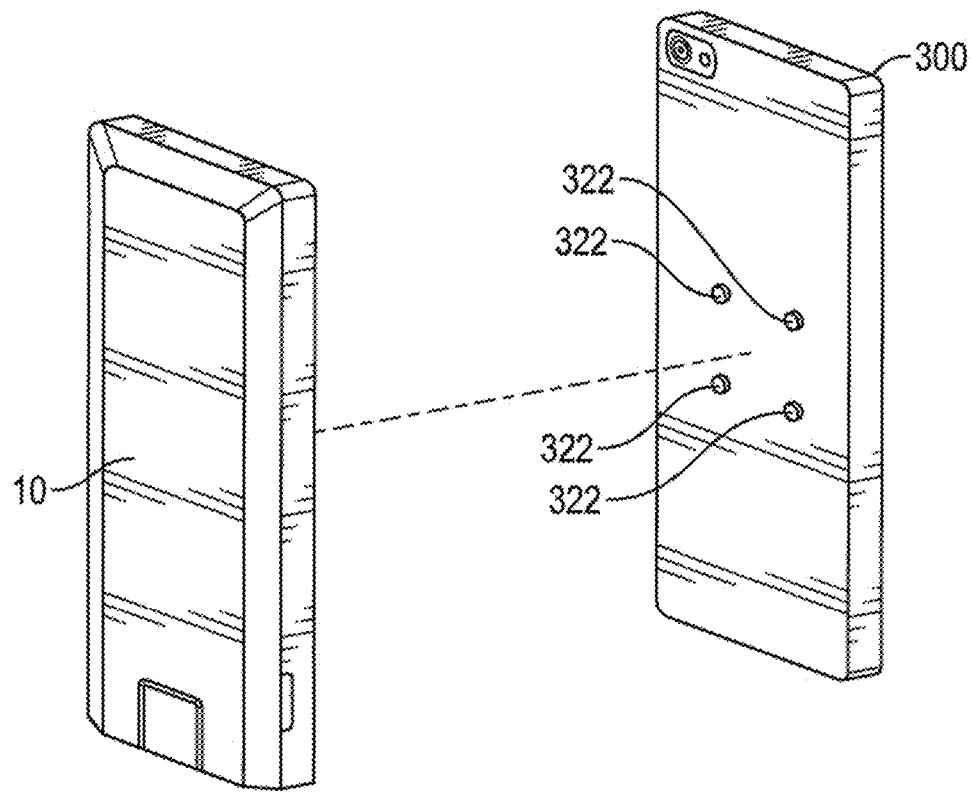
Figure 13C:
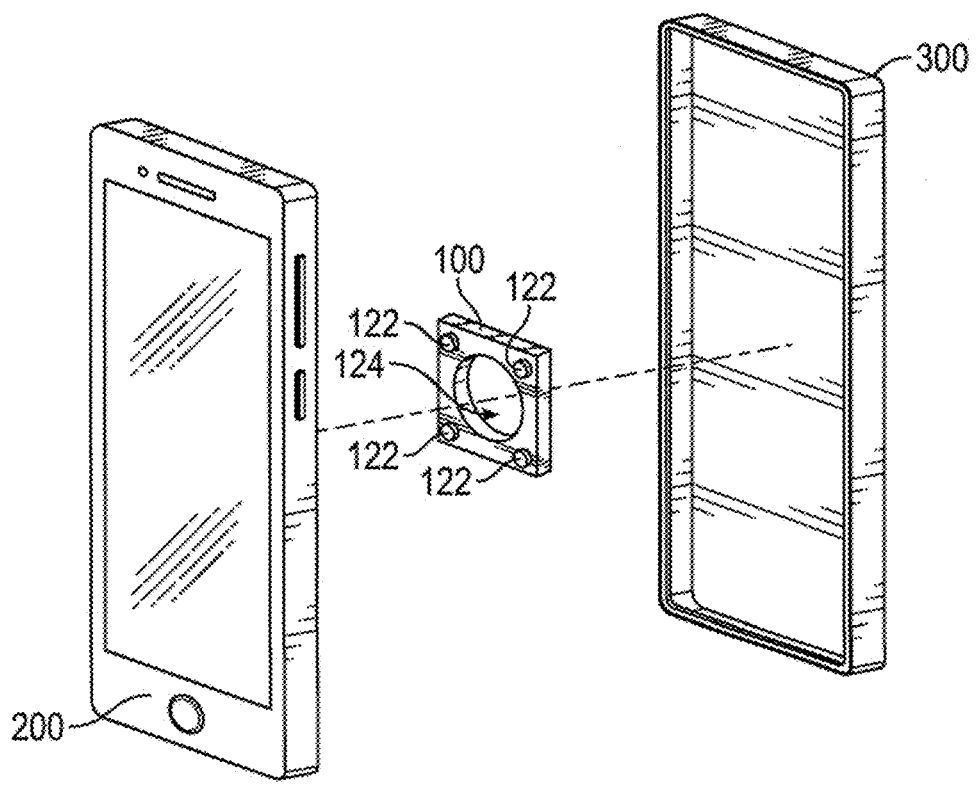
Figure 14:
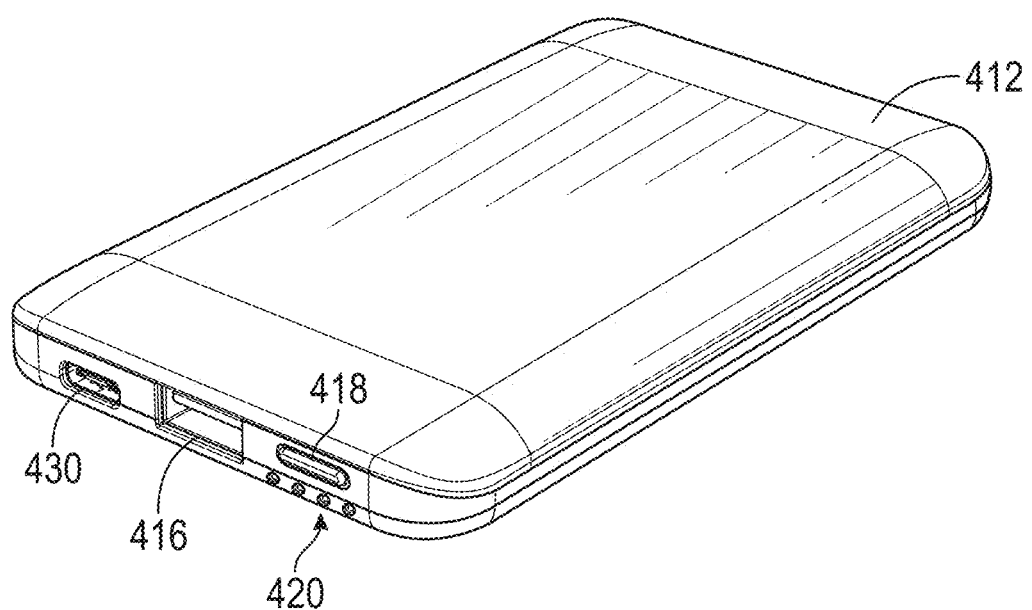
FIG. 14 shows a front, top perspective view of a second embodiment of a portable power charger in accordance with the present invention.

In another embodiment illustrated in FIGS. 13A-13C, a magnetic array, as described herein, can also be provided for an electronic device 200 within a protective case 300 designed for the electronic device 200. Such a case 300 may include a magnetic array 322 formed therein, or alternatively, provided by an attachment chip 100 attached between the device 200 and the protective case 300, whereby the magnetic array 322 on the case 300 or provided by an attachment chip 100 is located and oriented at a predetermined position relative to the reception area 237 for the electronic device 200. Thus, when the protective case 300 is installed on the electronic device 200, the device 200 is provided with the attachment means to effectuate proper and efficient wireless charging from the portable charger 10 when connected thereto.

In alternate embodiments, the magnets 222, 122, 322 on the electronic device 200, the attachment chip 100, or in a protective case 300, can simply be metallic pieces that will interact with the magnet(s) 22 provided on the portable power charger 10.

Referring to FIGS. 14-18, an alternate embodiment of a portable power charger in accordance with the present invention is illustrated and generally designated as reference numeral 410. Like components between charger 410 and charger 10 are identified by similar reference numerals. Further, the charger 410 may include components illustrated for the charger 10 and described herein with reference to charger 10 even though such components are not expressly discussed with respect to the embodiment of charger 410.

As illustrated, the charger 410 comprises a charger housing 412 having a rechargeable battery unit 414 internally disposed therein. The power charger 410 is designed for portability and convenient on-the-go use to recharge one or more mobile electronic devices and is designed to be attachable to an electronic device 200 via an attachment system comprising at least one attachment means 482 provided on a first external surface 421 of the charger housing 412. The attachment means 482 generally comprises an attaching surface that, when pressed against the surface of an electronic device 200, attaches the portable charger 410 to the electronic device 200, and vice versa, connecting the units together and allowing for hands-free carry and charge. In an embodiment of the present invention, said attachment means 482 comprises a pressure-sensitive adhesive, or "sticky", patch 484 which allows the portable power charger 410 to remain stuck to the electronic device 200 while charging, but allows for seamless removal when the charge is completed. The adhesive patch 484, for example, could comprise a pad made of sticky, reusable silicone rubber, or suction cups, or hook-and-loop fasteners. Using the illustrated adhesive patch 484, the power charger 410 can be attached to a variety of electronic devices 200, regardless of size and shape.

Figure 15:
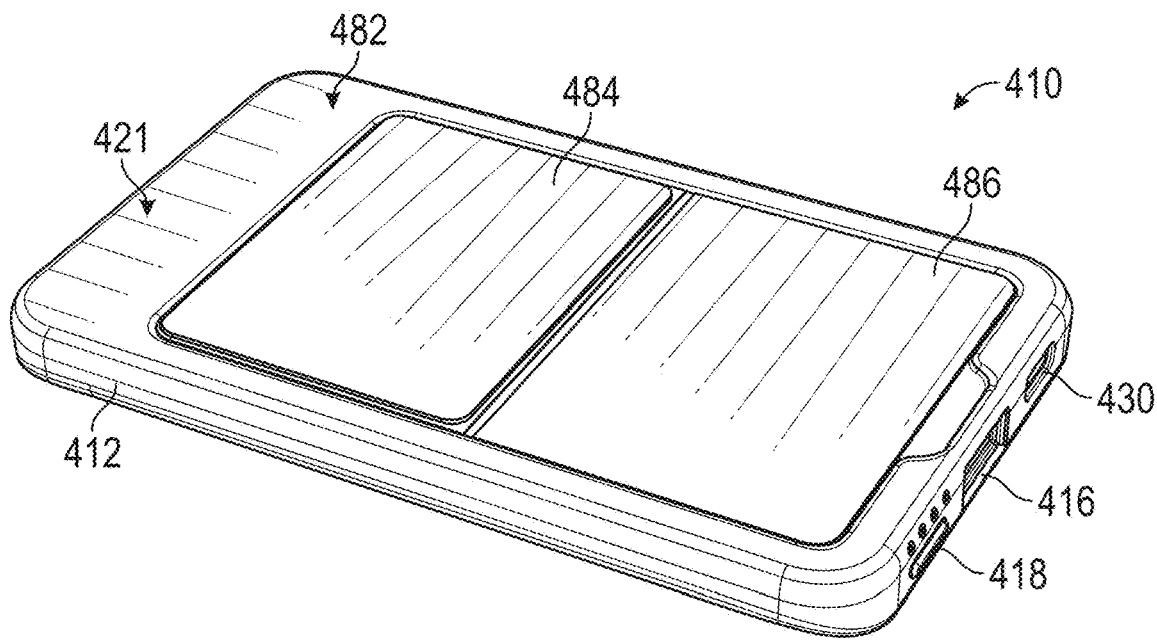
FIG. 15 shows a front, bottom perspective view of the portable power charger of FIG. 14 with a bottom flap folded backwards to expose attachment means.
Figure 16:
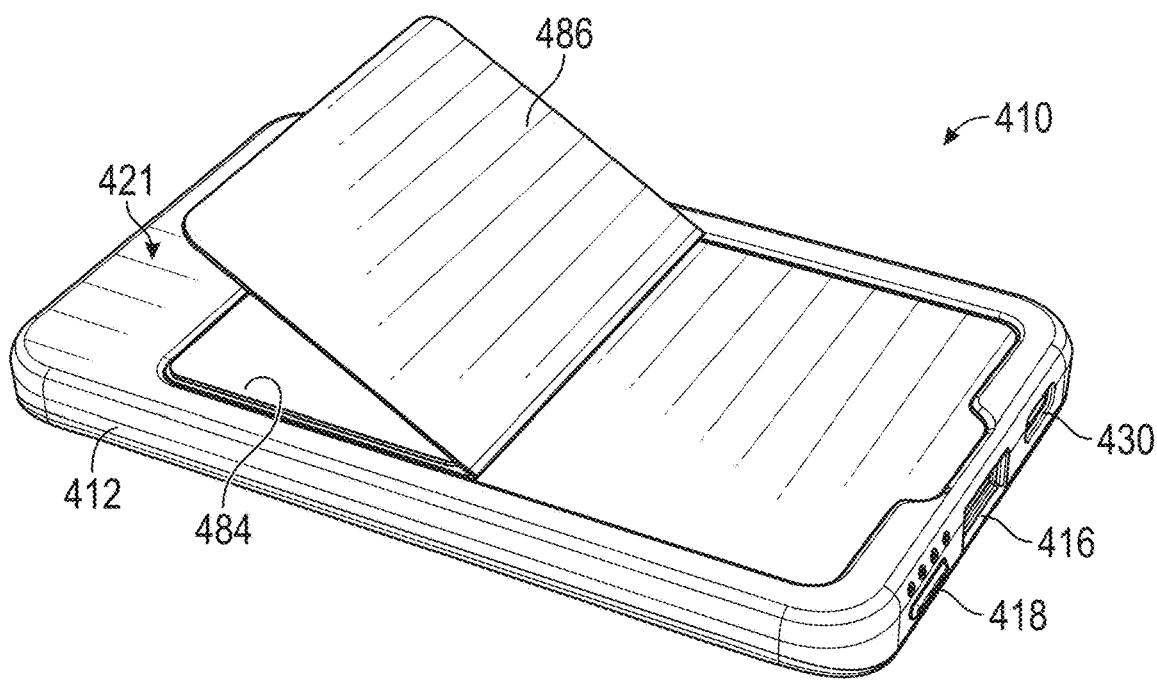
FIG. 16 shows a front, bottom perspective view of the portable power charger of FIG. 14 with a bottom flap being folded closed to cover and protect the attachment means.
Figure 17:
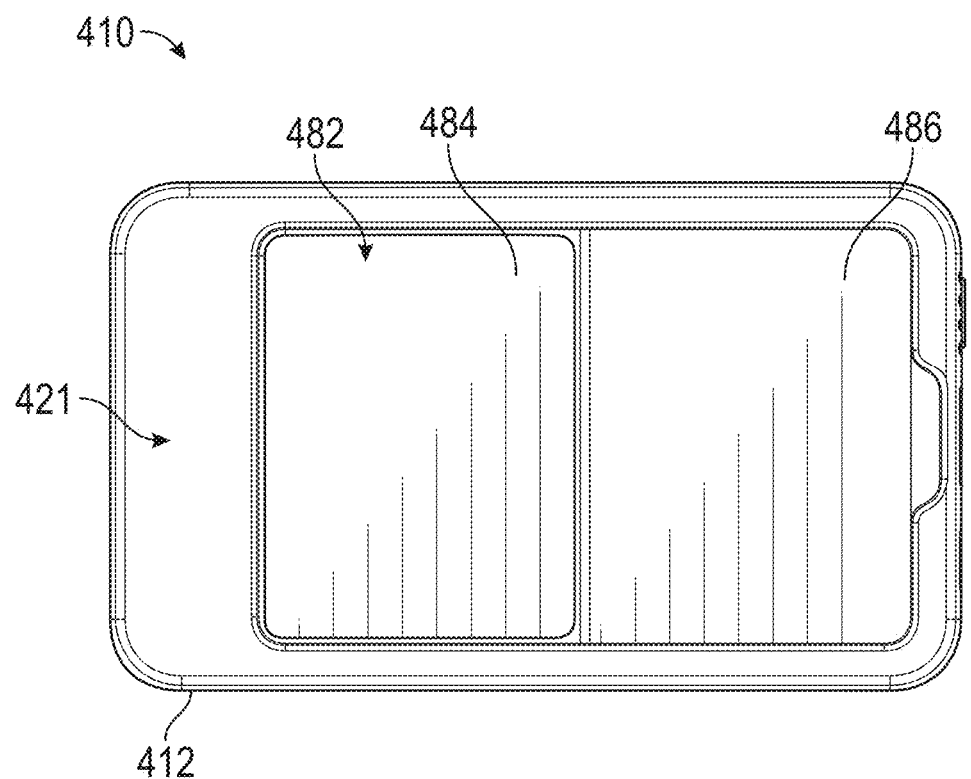
FIG. 17 shows a bottom planar view of the portable power charger of FIG. 14.
Figure 18:
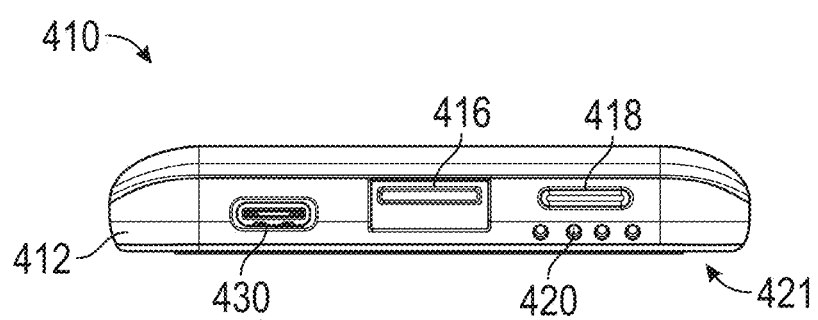
FIG. 18 shows a front-end planar view of the portable power charger of FIG. 14.
Figure 19:
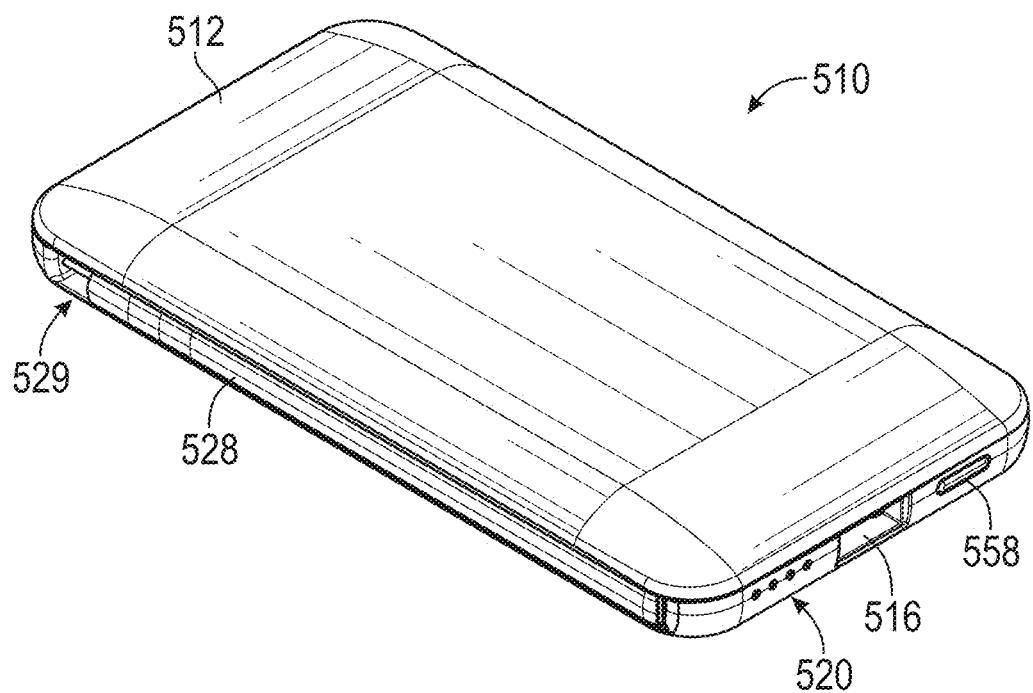
FIG. 19 shows a front, top perspective view of a third embodiment of a portable power charger in accordance with the present invention.
Figure 20:
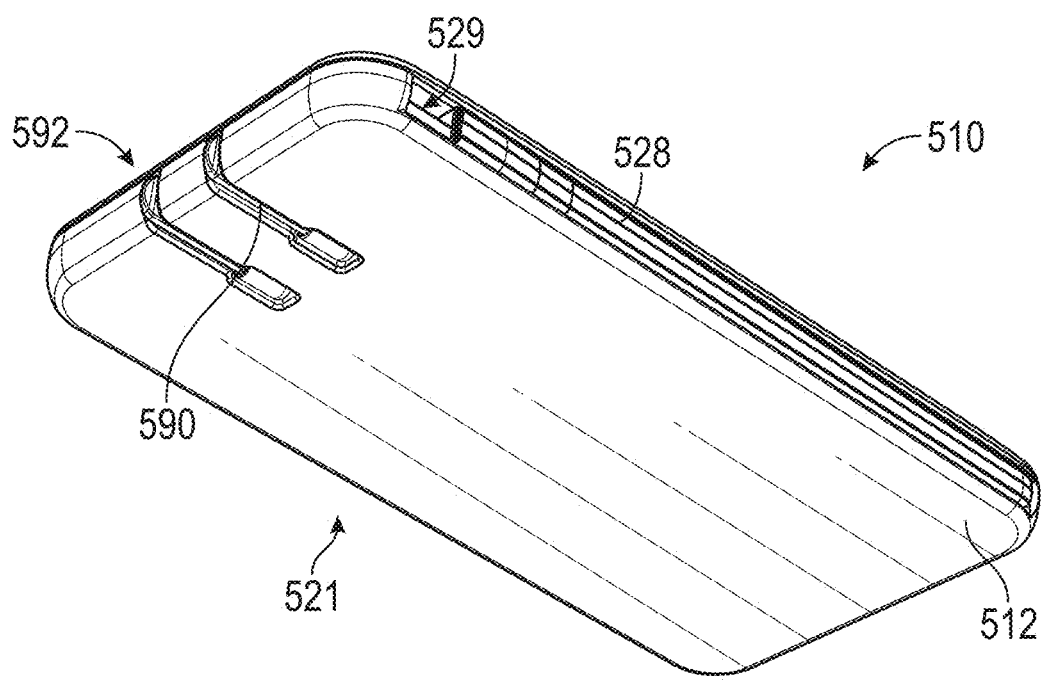
FIG. 20 shows a back, bottom perspective view of the portable power charger of FIG. 19.
Figure 21:
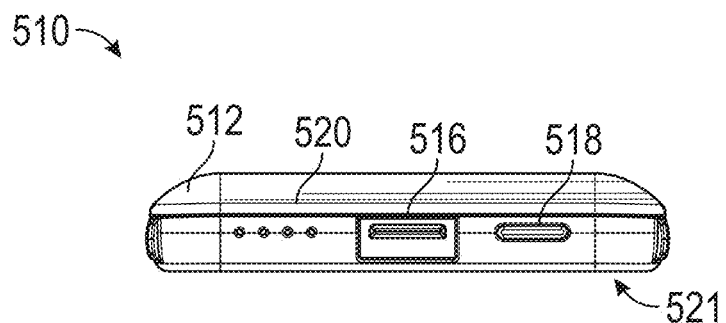
FIG. 21 shows a front-end planar view of the portable power charger of FIG. 19.
Figure 22:
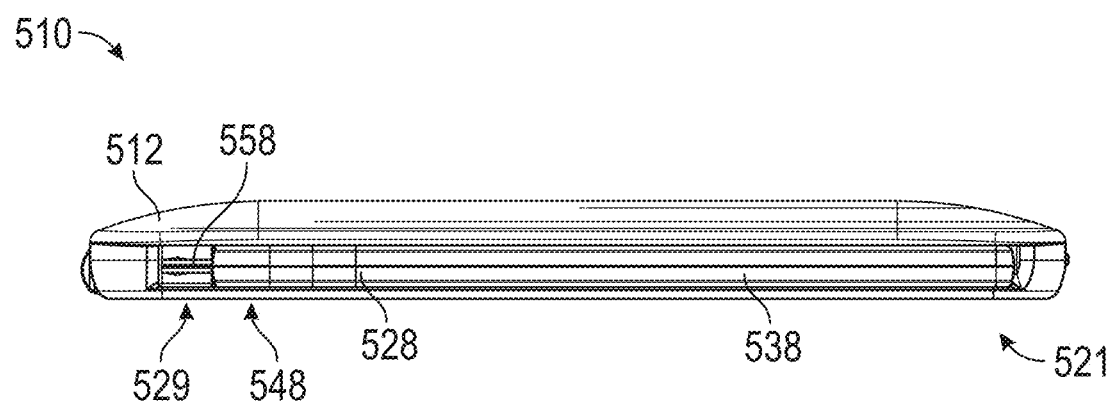
FIG. 22 shows a side planar view of the portable power charger of FIG. 19.

Further referring to FIG. 16, the charger 410 includes a flap 486 that can cover the sticky patch 484 when it is not in use so that the sticky surface of the patch 484 does not attach or get stuck to other items, for example, when the charger is being carried in a bag or coat pocket. FIG. 15 shows the flap 486 opened and exposing the sticky patch 484 for use to attach the charger 410 to an electronic device 200. FIG. 16 shows the flap 486 being pivoted to close the sticky patch 484 so that it can be covered and protected when not needed to attach the charger 410 to an electronic device 200.

Though only one attachment means 482 is illustrated in the embodiment of FIGS. 14-18, the charger 410 can include the first attachment means (comprising a magnetic array such as described and shown with reference to the charger 10) without departing from the principles and spirit of the present invention.

Though not shown, the charger 410 can further include internal wireless transmission components, such as a wireless transmitter and a wireless receiver, as described above.

In the embodiment shown in FIGS. 14-18, the portable power charger 410 has the capability of charging other devices or being recharged itself via wireless transmissions or via direct connections, either using connector cables provided with and stored in the charger housing 412, or via separate connector cables attachable to the charger 410 via power connection ports 430 and 416 provided on the charger housing 412. In this regard, the portable charger 410 can be used on-the-go to charge one or more electronic devices 200 by various means and combinations of means.

Figure 4:
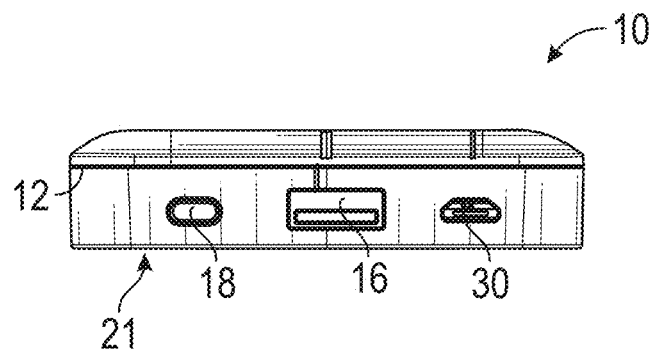
FIG. 4 shows a planar front-end view of the portable power charger of FIG. 1.
Figure 5:
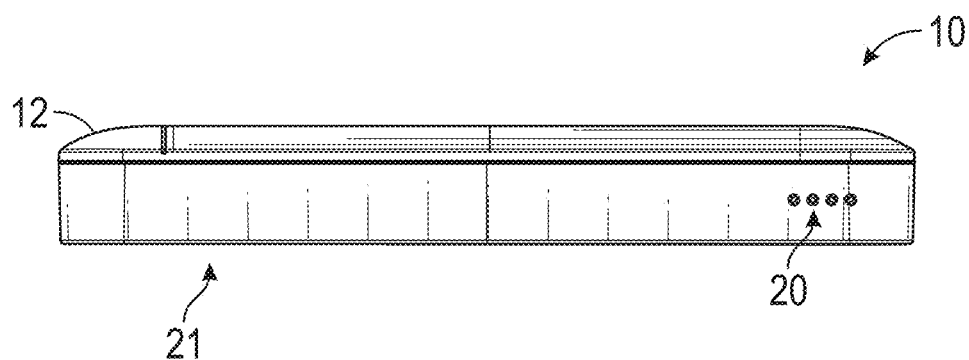
FIG. 5 shows a planar side view of the portable power charger of FIG. 1.

Referring to FIG. 4, the portable power charger 10 may include a power connection input port 30 on the charger housing 12. The power connection input port 30 is operatively connected with the internal battery 14 to provide a charge to the internal battery 14 when the power charger 10 is connected to an external power source via the power connection input port 30. As shown, the power connection input port 30 comprises a micro-USB female interface, though the power connection input port 30 can utilize any known connection interface without departing from the principles and spirit of the present invention, including but not limited to a USB interface, a mini-USB interface, an AC-DC interface, or the like. In operation, a separate connector cable can be used to connect the power charger 10 with an external power source via the power connection input port 30.

Still referring to FIG. 4, a power connection output port 16 may also be provided on the charger housing 12. The power connection output port 16 is operatively connected with the internal battery 14 to provide a charge from the internal battery 14 to an electronic device 200 when the portable power charger 10 is connected to the electronic device 200 via the power connection output port 16. As shown, the power connection output port 16 comprises a USB female interface, though the power connection output port 16 can utilize any known connection interface without departing from the principles and spirit of the present invention, including but not limited to a micro-USB interface, a mini-USB interface, an AC-DC interface, and an adjustable cartridge capable of transforming from a USB female interface to a USB male interface depending on the position of the cartridge (as shown in Applicant's U.S. Pat. No. 10,418,839 and co-pending U.S. application Ser. No. 15/802,552, both incorporated herein by reference), providing for power output or input or the like. In operation, a separate connector cable (such as one provided with the electronic device 200) can be used to connect the portable power charger 10 with an electronic device 200 via the power connection output port 16.

Though the illustrated embodiment shows both a power connection input port 30 and a power connection output port 16, the present invention can use either means for power input or for power output. Further, the portable power charger 10 can use a power connection port that utilize a two-way charging interface, such as described in Applicant's U.S. Pat. No. 9,973,016, incorporated herein by reference, so that the port can act as both a power input and a power output, depending on what is connected to the port.

Referring to FIGS. 19-24, an alternate embodiment of a portable power charger in accordance with the present invention is illustrated and generally designated as reference numeral 510. Like components between charger 510 and charger 10 are identified by similar reference numerals. Further, the charger 510 may include components illustrated for the charger 10 and described herein with reference to charger 10 even though such components are not expressly discussed with respect to the embodiment of charger 510. For example, charger 510 may include one or both of the first and second attachment means 80 and 82 described above, even though neither is expressly illustrated in FIGS. 19-24. As illustrated, the charger 510 preferably includes an internal magnetic array (not shown), such as described above. A sticky patch, as illustrated in FIGS. 2-3 and 15-17 can also be provided on the external surface 521 of the charger housing 512 to facilitate attachment of the charger 510 with an electronic device 200.

Figure 23:
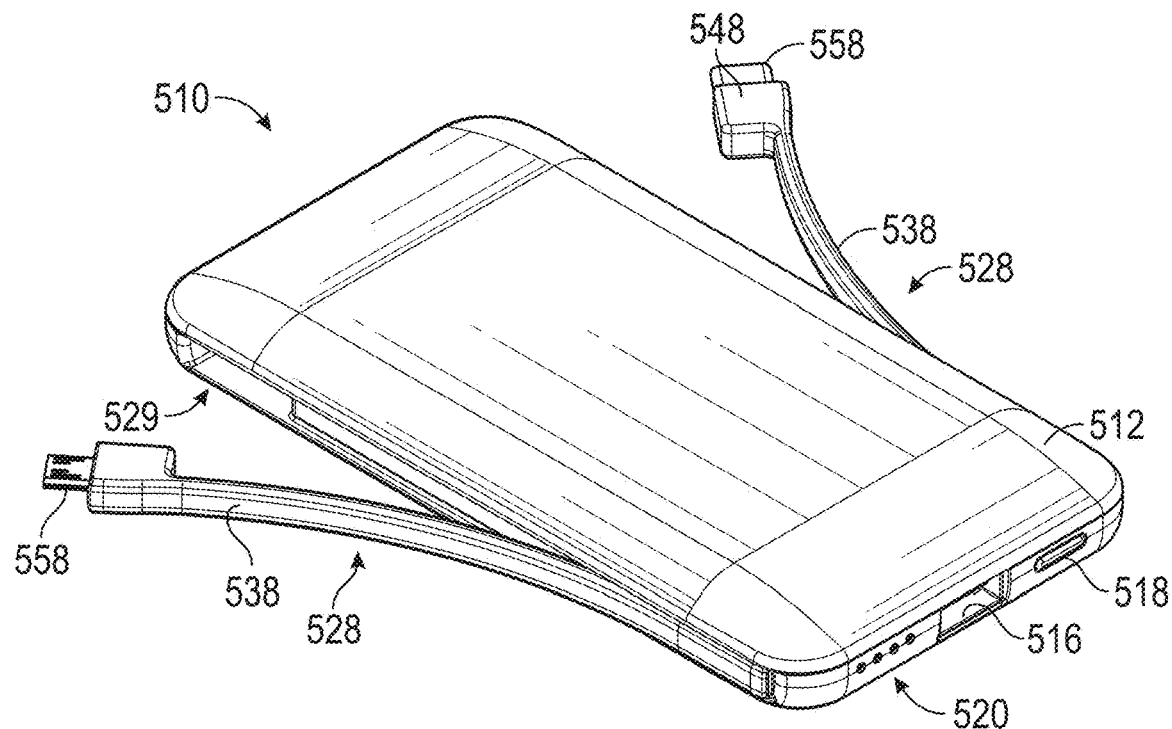
FIG. 23 is a front, top perspective view of the portable power charger of FIG. 19 with connector cables partially removed for use.
Figure 24:
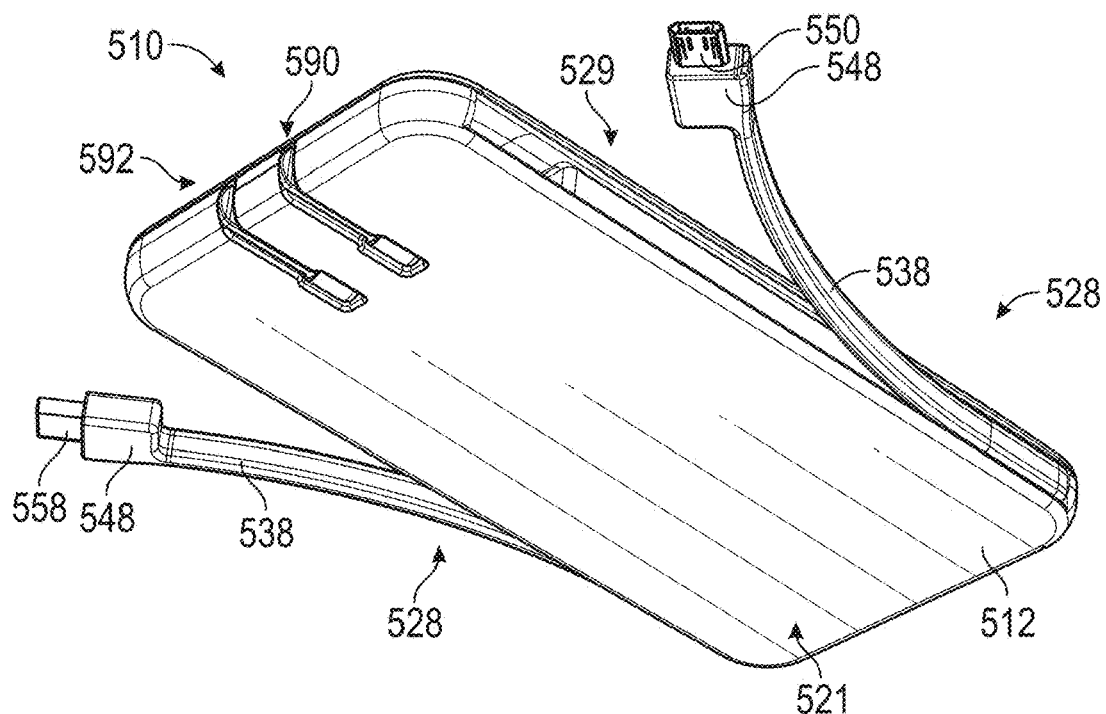
FIG. 24 is a back, bottom perspective view of the portable power charger of FIG. 19 with connector cables partially removed for use.

As illustrated in FIGS. 23 and 24, charger 510 includes one or more built-in power output connector cables 528 provided with the charger housing 512 for connecting the portable power charger 510 with electronic devices 200. Each connector cable 528 is preferably stored within a respective cavity 529 formed in the charger housing 512 when not in use, and flexed out and away from and/or removed from the cavity 529 for use. Each power output connector cable 528 is operatively connected with the internal battery 514 for providing a charge to a respective electronic device 200 connected to the power charger 510 via the connector cable 528. As illustrated, the connector cable 528 comprises a cord portion 538 and a head portion 548 having a connection interface 558 designed for engagement with an electronic device 200 or an adapter unit.

The cavity 529 for the connector cable 528 is preferably designed to have a complementary shape to the connector cable 528 so that the cable 528 can be stored within the general volume and footprint of the charger housing 512 when not in use (as illustrated in FIGS. 19-22). In this regard, the existence of the connector cable interface 528 does not interfere with use of the portable power charger 510, and further does not detract from the size and appearance of the charger 510. In preferred embodiments, the connector cables 528 can be snap-fit into the cavities 529 to secure them into place. In alternate embodiments, the connector cables 528 can be secured in place within the cavities 529 by magnetic means integrated into the charger housing 512.

When the power output connector cable 528 is needed for use, it can be disengaged from its cavity 529 and extended away from the charger housing 512 (as illustrated in FIGS. 23-24) so that the head portion 548 and interface 558 can engage an appropriate electronic device 200 or adapter unit. The interface 558 can utilize any known connection interface without departing from the principles and spirit of the present invention. The cord portion 538 can be disengaged from the cavity 529 to flex the connector cable interface 528 outwardly from the charger housing 512. Finger spaces (not shown) can be provided to assist the user to get a grip on the connector cable interface 528. Alternatively, the power output connector cable 528 can be retracted within the charger housing 512 to respective non-use positions, for example, using a spring-biased retraction mechanism as is generally known in the art.

In embodiments of the present invention, the connector cables 528 can be connected with the internal battery 514 via a connection interface provided through the cavity 529. In the alternative, the connector cables 528 can be designed for use with the power input and output ports 530 and 516, such that, for use, a connector cable 528 is fully removed from its storage cavity 529 and connected between the portable power charger 510 and either an electronic device 200 in need of a charge or an external power source capable of providing a charge to the charger 510.

In a preferred embodiment, as shown, the portable power charger 510 is provided with two connector cables 528, one disposed on each side of the charger housing 512 within complementary shaped storage cavities 529 and secured by snap-fit or integrated magnetic means, or both means. Such connector cables 528 can be part of a kit of interchangeable connector cables 528, such that a first connector cable 528 can be removed from the charger housing 512 and replaced with a different connector cable 528, that also fits securely into the storage cavity 529. The second cable 528 will have a different connection interface 558 such that cables 528 can be interchanged, as needed, so that the portable power charger 510 can be used with a variety of electronic devices 200 with varying connection requirements. For example, the kit of the portable power charger 510 can include a first connector cable 528 having a USB interface and a micro-USB interface; a second connector cable 528 having a USB interface and an Apple Lightning™ interface; a third connector cable 528 having a USB interface and a USB-C interface; and a fourth connector cable 528 having dual USB-C interfaces. For the embodiment shown in FIGS. 19-24, two of these four connector cables 528 can be provided on the charger 510, while the remaining cables 528 can be switched in, as desired.

The charger 510 can also be provided with a direct power input connection, such as a plug 590 provided on the charger housing 512 and in operative communication with the internal battery 514. As illustrated, the plug 590 can be pivotable between an extended use condition and a retracted storage condition. When extended, the plug 590 can be plugged into a standard power outlet to provide a charge to the internal battery 514 for recharging. When not needed, the plug 590 can be pivoted to its retracted condition within a cavity 592 formed in the charger housing 512.

Though not shown, the charger 510 can further include internal wireless transmission components, such as a wireless transmitter and a wireless receiver, as described above.

In the embodiment shown in FIGS. 19-24, the portable power charger 510 has the capability of charging other devices or being recharged itself via wireless transmissions or via direct connections, either using the connector cables 528 provided with and stored in the charger housing 512, or via separate connector cables attachable to the charger 510 via power connection ports 530 and 516 provided on the charger housing 512. In this regard, the portable charger 510 can be used on-the-go to charge one or more electronic devices 200 by various means and combinations of means.

Figure 25:
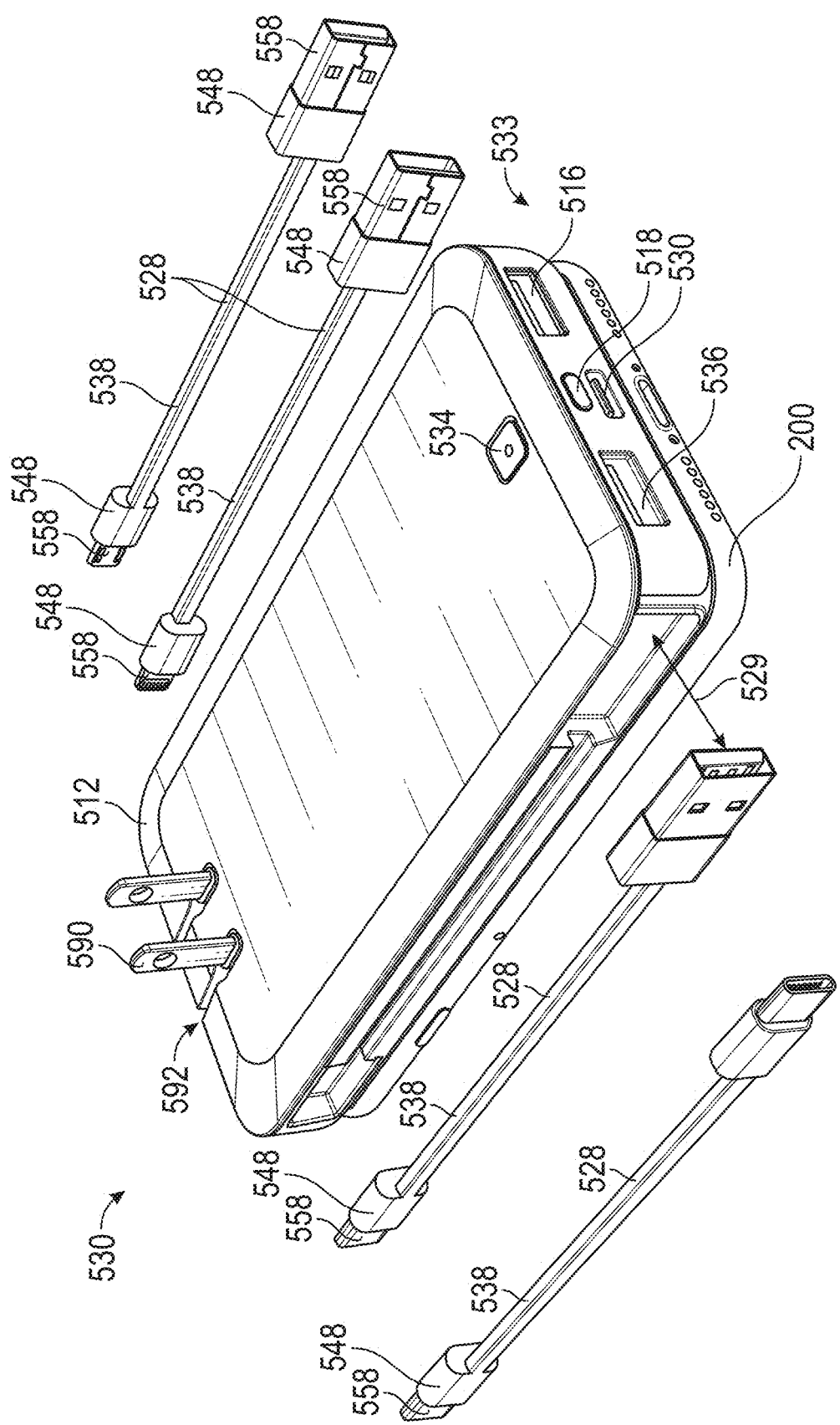
FIG. 25 shows a front, top perspective view of a fourth embodiment of a portable power charger in accordance with the present invention.

An alternate design for a portable power charger 510 with interchangeable connector cables 528 storable in cavities 529 formed in the charger housing 512 is illustrated in FIG. 25.

In preferred embodiments of the present invention, power capacity means 20 are also provided to indicate the capacity of the internal battery unit 14. In an embodiment of the present invention, a portion of the charger housing 12 is made of a translucent material and has one or more LED lights disposed behind it. Thus, the power capacity indication is provided by the LED light illuminating is different colors corresponding to different charge levels—e.g., green when the battery is mostly charged; yellow when the charge is reduced by at least more than half; and red when the charge level is low and the battery 14 is in need of a recharge.

An additional LED light can be provided so as to provide a flashlight feature, general designated as reference numeral 533. As illustrated in FIG. 25, a dedicated power button 534 can be provided for manual operation of the flashlight feature 533. When turned on, the face of the charger can light up.

As noted, a wireless receiver 36 can also be provided in the charger 10. In operation, placing the charger 10 on a wireless transmission device, such as a wireless charging mat, so that the receiver 36 aligns with a transmitter in the wireless transmission device will recharge the internal battery 14 via a wireless connection. A receiver 36 generally comprises a magnetic induction coil operatively connected to the internal battery 14, as generally illustrated in FIG. 6.

Though schematically illustrated as side-by-side in FIG. 6, this representation of the transmitter 26 and receiver 36 is merely provided for illustration purposes and in practice, the transmitter 26 is generally in line with the receiver 36 so that the transmission area 27 and the reception area for the charger 10 are generally centered within the charger housing 12.

The wireless charging capabilities of the portable power charger 10 in accordance with the present invention are beneficial in that they improve upon the convenience provided by wireless charging technology. For example, a portable electronic device 200 can be recharged on-the-go even when the proper charging connector cable is not available. Indeed, the compact and portable design of the portable power charger 10 can permit charging of an electronic device 200 in the user's pocket or purse simply by attaching the portable power charger 10 to the electronic device 200 or an electronic device protective case 300 for said device 200, and ensuring that the electronic device 200 is properly aligned with and proximate to the portable power charger 10. Additionally, once the portable power charger 10 is charged, a portable electronic device 200 can be recharged without needing to be near an external power source, such as a wall socket, a car charger socket, an airplane charger socket, or a computer, which may not be readily available.

Operation of the portable power charger 10 to transmit a charge to an electronic device 200 via direct connection means or via wireless transmission means may be controlled by a power interface 18, such as an on/off button, as shown in FIGS. 4, 18, 21 and 25.

In preferred embodiments of the present invention, the portable power charger 10 can be automatically turned on when an electronic device 200 is connected to the portable power charger 10 via a power connector cable interface 28 or a power connection port interface 16 or wirelessly. Further, the power charger 10 can use a power-off logic that automatically turns the charger 10 off after a pre-designated time period, provided certain criteria have been met. Such a protocol is described in Applicant's U.S. Pat. No. 9,973,016, which is incorporated herein by reference, whereby the portable power charger 10 will automatically turn off after a predefined time delay after it is determined that the internal battery of all electronic devices connected to the portable power charger 10 are fully charged.

In operation, a portable power charger 10 in accordance with the present invention can be used in a variety of manners for recharging the power charger 10 itself, as well as for recharging portable electronic devices 200. As a result of the compact size of the portable power charger 10 and the capacity of the built-in power bank, the portable power charger 10 can be used on-the-go to recharge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations.

In preferred embodiments, the rechargeable battery 14 is preferably a Lithium-Ion battery that can be recharged by connecting the portable power charger 10 to an external power source, such as a computer, a wall socket, a car or an airplane power supply, or to a wireless power transmission device, such as a wireless charging mat. The rechargeable battery 14 is disposed within the charger housing 12 and is operatively connected with any and all input and output connector cable interfaces, input and output connector port interfaces, and any and all wireless receivers and wireless transmitters for receiving a charge from an external power source and transmitting a charge to one or more electronic devices connected to the portable power charger 10, either wirelessly or through power output means.

The charger housing 12 encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.), in addition to wireless transmission of power.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable power charger for recharging an electronic device having a rechargeable internal battery, said portable power charger unit comprising:
   a charger housing internally storing a rechargeable battery, said charger housing having a generally planar first surface having a first area;
   a wireless transmitter operatively connected to the rechargeable battery capable of wireless transmitting a power to an electronic device attached thereto, said wireless transmitter defining a wireless transmission area;
   first attachment means comprising a magnet positioned on or near the first surface of the charger housing at a predetermined location relative to the wireless transmission area and being adapted for interaction with an electronic device having at least one of a magnet and a metallic piece so positioned on the electronic device such that when said electronic device is attached to the portable charger via the magnet in the portable charger and the magnet or metallic piece in the electronic device, a wireless receiver in said electronic device is aligned with the wireless transmitter in the portable charger; and
   second attachment means on the first surface of said housing for attaching the charger housing to an electronic device, wherein said second attachment means do not inhibit attachment to an electronic device having an effective planar area that is bigger or smaller than the first area.

2. The portable power charger according to claim 1, wherein the magnet on the charger housing comprises a plurality of magnets geometrically arranged on or near the first surface of the charger housing in spaced apart relationship to one another.

3. The portable power charger according to claim 2, wherein the geometrical arrangement of magnets on the portable charger defines a central space generally aligned with the wireless transmission area so that the magnets do not interfere with transmission from the wireless transmitter.

4. The portable power charger according to claim 2, wherein the plurality of magnets comprises four magnets generally arranged to define a square.

5. The portable power charger of claim 1, wherein the second attachment means comprises an adhesive patch.

6. The portable power charger of claim 1, wherein the second attachment means comprises at least one suction cup.

7. The portable power charger according to claim 1, further comprising at least one power connection interface operatively connected to the rechargeable battery capable of operating as at least one of a power input and a power output, wherein when said at least one power connection interface acts as a power input, an electrical charge current is provided from an external power source to the portable power charger for recharging the rechargeable battery when the portable power charger is connected to said external power source via said at least one power connection interface, and wherein when the said at least one power connection interface acts as a power output, a charge is provided from the rechargeable battery of the portable power charger to an electronic device to recharge the rechargeable battery of said electronic device when said electronic device is connected to the portable power charger via said at least one power connection interface.

8. The portable power charger according to claim 7, wherein said at least one power connection interface comprises at least one of a power connection port and a power connection cable operatively connected to the rechargeable battery.

9. The portable power charger according to claim 8, wherein said at least one power connection interface comprises at least one power connection cable storable within a storage cavity formed in the charger housing when not in use.

10. The portable power charger according to claim 9, wherein said at least one power connection cable comprises multiple interchangeable power connection cables having varying power connection interfaces, each said power connection cable being storable in the storage cavity, removable from said storage cavity, and replaceable with another of the power connection cables.

11. A wireless charging kit for connecting and aligning an electronic device having a rechargeable internal battery to and with a power source for charging of the internal battery of said electronic device, said kit comprising:
   a portable power charger comprising:
      a charger housing internally storing a rechargeable battery, said charger housing having a generally planar first surface having a first area;
      a wireless transmitter operatively connected to the rechargeable battery capable of wireless transmitting a power to an electronic device attached thereto, said wireless transmitter defining a wireless transmission area;
      first attachment means comprising a magnet positioned on or near the first surface of the charger housing at a predetermined location relative to the wireless transmission area; and
      second attachment means on the first surface of said housing for attaching the charger housing to an electronic device, wherein said second attachment means do not inhibit attachment to an electronic device having an effective planar area that is bigger or smaller than the first area; and
   an attachment chip adapted for attachment to the electronic device, said attachment chip including a number of magnets complementing the number of magnets on the charger housing, whereas when the attachment chip is attached to the electronic device, the magnets are positioned at a location relative to a wireless reception area for said electronic device such that when the electronic device is connected to the portable charger via interaction of the respective magnets, a wireless receiver of the electronic device is aligned with the transmitter of the portable charger for wireless exchange of a power from the transmitter to the receiver.

12. The wireless charging kit according to claim 11, wherein the at least one magnet on the charger housing comprises a plurality of magnets geometrically arranged on or near the outer surface of the charger housing in spaced apart relationship to one another; and wherein the attachment chip includes a complementary number of magnets arranged in the same geometrical arrangement and space apart relationship as for the plurality of magnets on the portable charger.

13. The wireless charging kit according to claim 12, wherein the geometrical arrangement of magnets on the portable charger defines a central space generally aligned with the wireless transmission area so that the magnets do not interfere with transmission from the wireless transmitter.

14. The wireless charging kit according to claim 12, wherein the plurality of magnets comprises four magnets generally arranged to define a square.

15. The wireless charging kit according to claim 11, wherein the attachment chip comprises a generally flat disc having an attachment surface adapted for attachment to a surface of the electronic device.

16. The wireless charging kit according to claim 15, wherein the attachment chip has an adhesive material on the attachment surface for attaching the chip to the electronic device.

17. The wireless charging kit according to claim 15, wherein the disc defines an opening with the number of magnets spaced therearound, said opening generally being aligned with the wireless reception area associated with the wireless receiver of the electronic device when the attachment chip if attached to said electronic device so that the magnets on the attachment chip do not interfere with reception of wireless signals by the wireless receiver.

18. The wireless charging kit according to claim 11, wherein the attachment chip is adapted for mounting within a case designed to be fitted onto the electronic device, the magnets of the attachment chip being positioned relative to the wireless reception area of the electronic device in a predetermined location so that when the electronic device is connected to the portable charger via interaction of the respective magnets, the wireless receiver of the electronic device is aligned with the transmitter of the portable charger for wireless exchange of a power from the transmitter to the receiver.

19. The portable power charger of claim 11, wherein the second attachment means comprises an adhesive patch.

20. The portable power charger of claim 11, wherein the second attachment means comprises at least one suction cup.

21. The portable power charger according to claim 11, further comprising at least one power connection interface operatively connected to the rechargeable battery capable of operating as at least one of a power input and a power output, wherein when said at least one power connection interface acts as a power input, an electrical charge current is provided from an external power source to the portable power charger for recharging the rechargeable battery when the portable power charger is connected to said external power source via said at least one power connection interface, and wherein when the said at least one power connection interface acts as a power output, a charge is provided from the rechargeable battery of the portable power charger to an electronic device to recharge the rechargeable battery of said electronic device when said electronic device is connected to the portable power charger via said at least one power connection interface.

22. The portable power charger according to claim 21, wherein said at least one power connection interface comprises at least one of a power connection port and a power connection cable operatively connected to the rechargeable battery.

23. The portable power charger according to claim 22, wherein said at least one power connection interface comprises at least one power connection cable storable within a storage cavity formed in the charger housing when not in use.

24. The portable power charger according to claim 23, wherein said at least one power connection cable comprises multiple interchangeable power connection cables having varying power connection interfaces, each said power connection cable being storable in the storage cavity, removable from said storage cavity, and replaceable with another of the power connection cables.

* * * * *